(12) United States Patent
Sato et al.

(10) Patent No.: US 10,477,108 B2
(45) Date of Patent: Nov. 12, 2019

(54) IMAGE PICKUP APPARATUS AND IMAGE PICKUP METHOD

(71) Applicant: OLYMPUS CORPORATION, Hachioji-shi, Tokyo (JP)

(72) Inventors: Tomoyuki Sato, Yokohama (JP); Hitoshi Tsuchiya, Hamura (JP); Takanori Fukuda, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 91 days.

(21) Appl. No.: 15/612,383

(22) Filed: Jun. 2, 2017

(65) Prior Publication Data

US 2017/0353665 A1 Dec. 7, 2017

(30) Foreign Application Priority Data

Jun. 6, 2016 (JP) .................. 2016-112755

(51) Int. Cl.
| | |
|---|---|
| *H04N 5/232* | (2006.01) |
| *G06T 7/30* | (2017.01) |
| *H04N 5/225* | (2006.01) |
| *H04N 5/235* | (2006.01) |
| *H04N 5/445* | (2011.01) |

(52) U.S. Cl.
CPC .......... *H04N 5/23267* (2013.01); *G06T 7/30* (2017.01); *H04N 5/2252* (2013.01); *H04N 5/2327* (2013.01); *H04N 5/2351* (2013.01); *H04N 5/2353* (2013.01); *H04N 5/23209* (2013.01); *H04N 5/23258* (2013.01); *H04N 5/44504* (2013.01); *G06T 2207/10016* (2013.01)

(58) Field of Classification Search
CPC ........................ H04N 5/23248–2329

USPC ...................................... 348/208.99
See application file for complete search history.

(56) References Cited

U.S. PATENT DOCUMENTS

| 6,778,210 B1 * | 8/2004 | Sugahara ........... H04N 5/23248 348/208.4 |
| 2002/0075389 A1 * | 6/2002 | Seeger .................. H04N 5/232 348/222.1 |

(Continued)

FOREIGN PATENT DOCUMENTS

| CN | 101035204 A | 9/2007 |
| CN | 105594191 A | 5/2016 |
| JP | 2014-053720 A | 3/2014 |

OTHER PUBLICATIONS

Office Action issued in corresponding Chinese Patent Application No. 201710414017.5 dated Sep. 3, 2019, consisting of 27 pp. (English Translation Provided).

*Primary Examiner* — Anthony J Daniels
(74) *Attorney, Agent, or Firm* — Volpe and Koenig, P.C.

(57) ABSTRACT

Image pickup apparatus includes imaging control circuit, keystone correction circuit, and composite circuit. Imaging control circuit acquires plurality of first images corresponding to subject image formed on imaging plane by image pickup optical system by causing imaging element to execute exposure plurality of times in accordance with imaging instruction. Keystone correction circuit corrects keystone distortion occurring in each first image due to change of attitude of body, by keystone correction based on tilt angle corresponding to each first image, and the optical characteristic, thereby generating plurality second images. Composite circuit generates third image by compositing second images.

13 Claims, 19 Drawing Sheets

(56) References Cited

U.S. PATENT DOCUMENTS

| | | | |
|---|---|---|---|
| 2003/0043303 A1* | 3/2003 | Karuta | G02B 27/0025 348/744 |
| 2003/0095189 A1* | 5/2003 | Liu | H04N 5/23248 348/208.4 |
| 2003/0151679 A1* | 8/2003 | Amerson | H04N 5/23212 348/231.6 |
| 2007/0212045 A1 | 9/2007 | Yamasaki | |
| 2011/0090303 A1* | 4/2011 | Wu | G06K 9/00228 348/14.16 |
| 2014/0028839 A1* | 1/2014 | Ishibashi | H04N 5/217 348/140 |
| 2015/0138383 A1* | 5/2015 | Kelley | G06T 5/006 348/208.6 |
| 2016/0191820 A1 | 6/2016 | Iwasaki | |

* cited by examiner

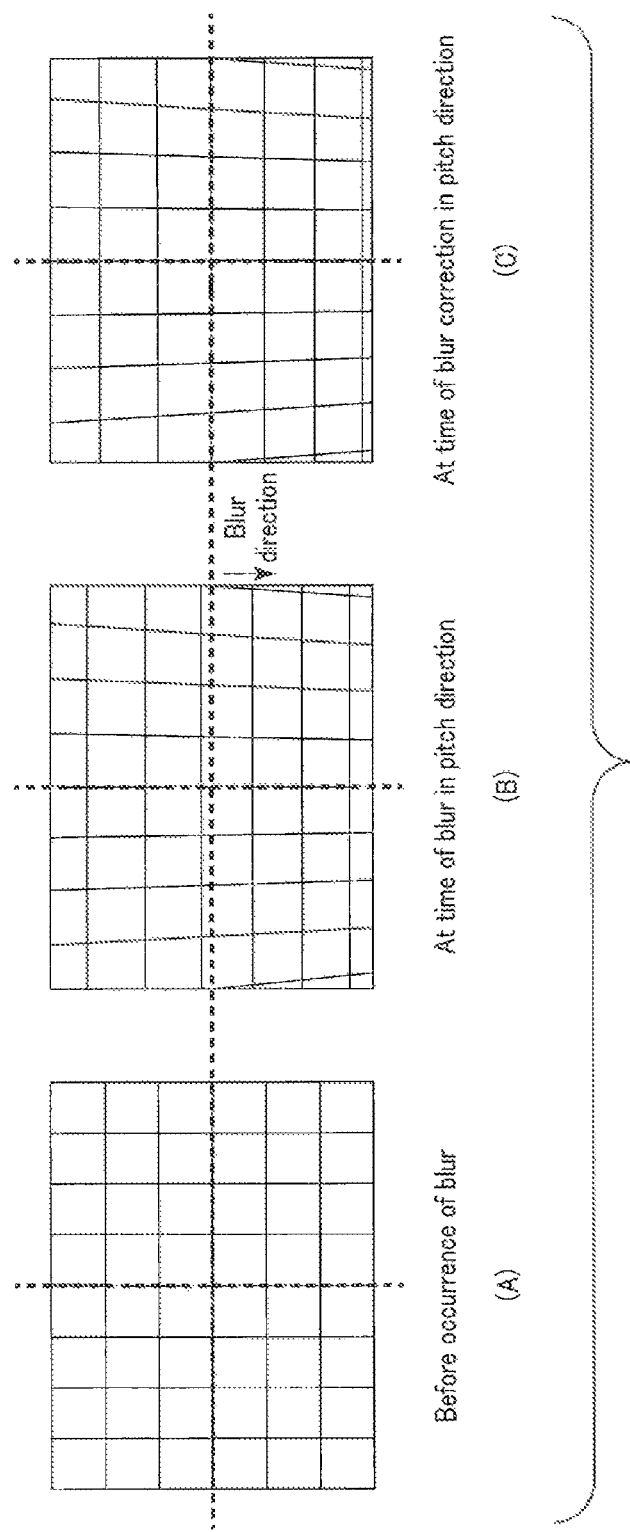
F I G. 4

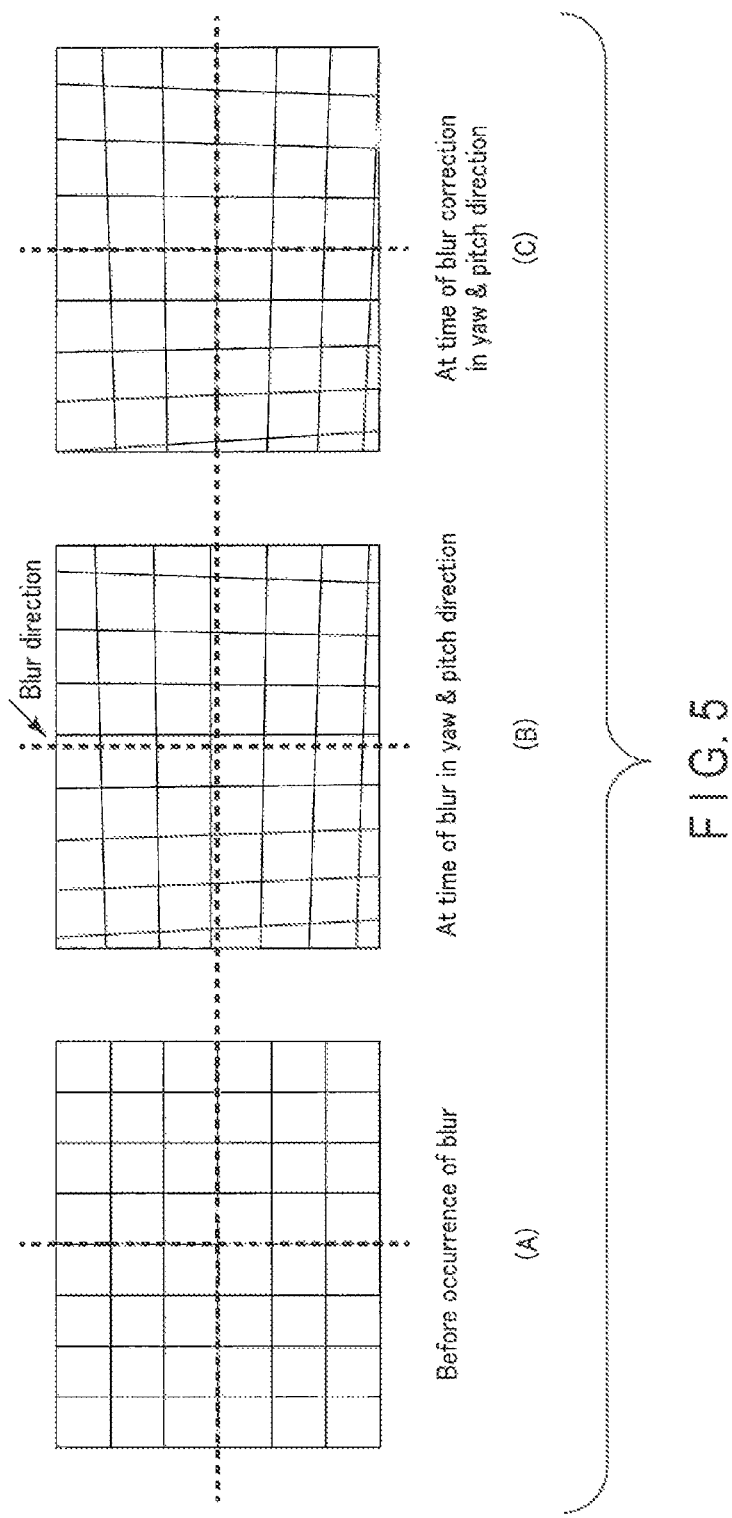
F I G. 5

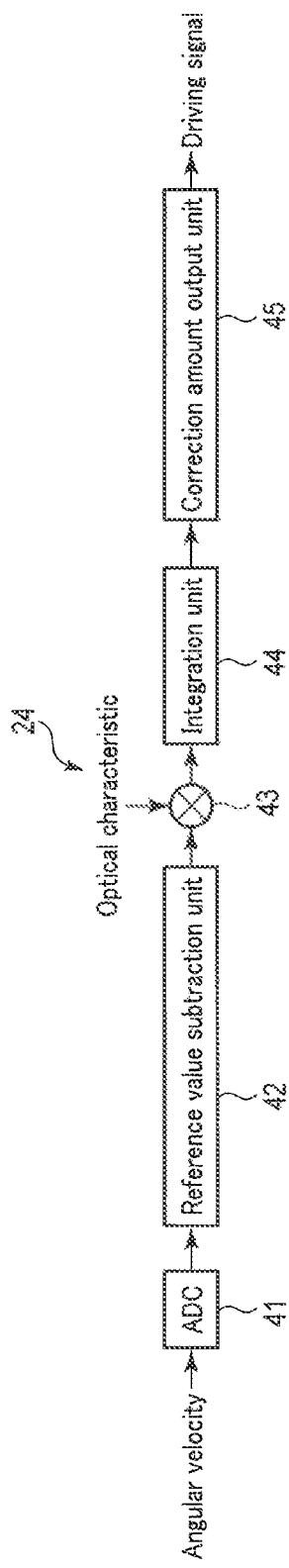
F I G. 8

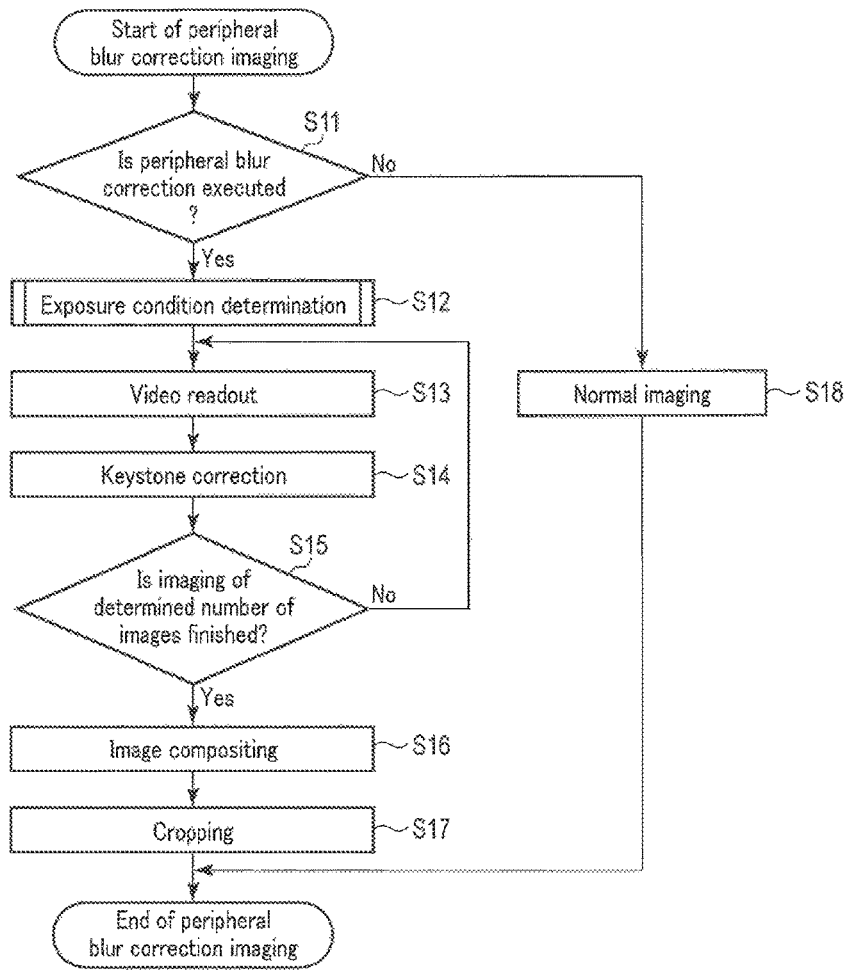
F I G. 9

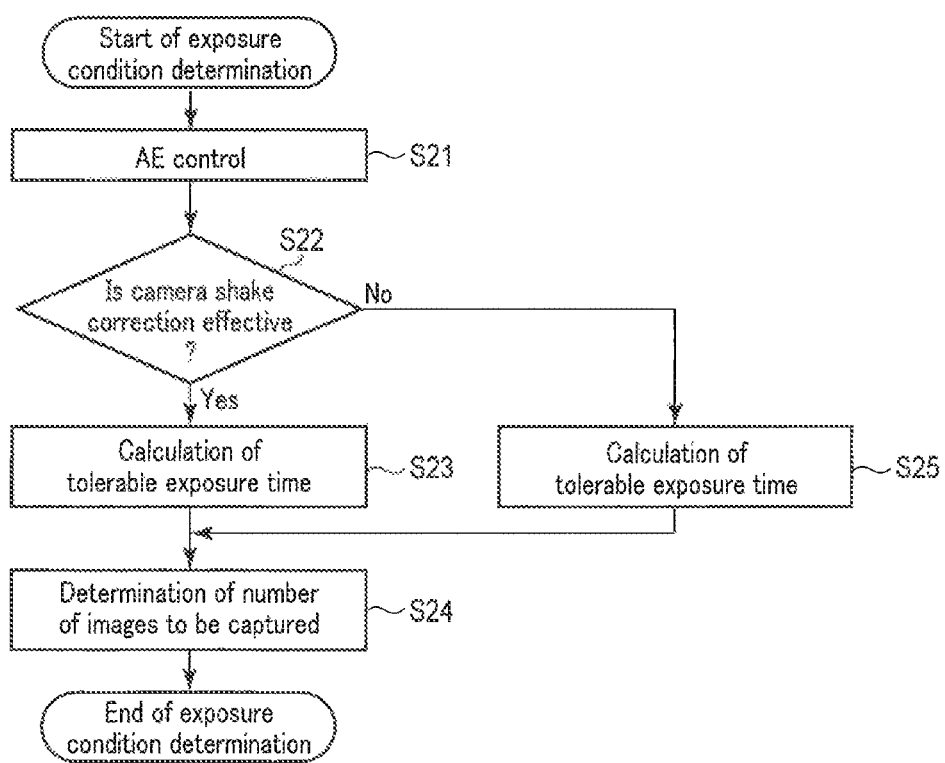
F I G. 10

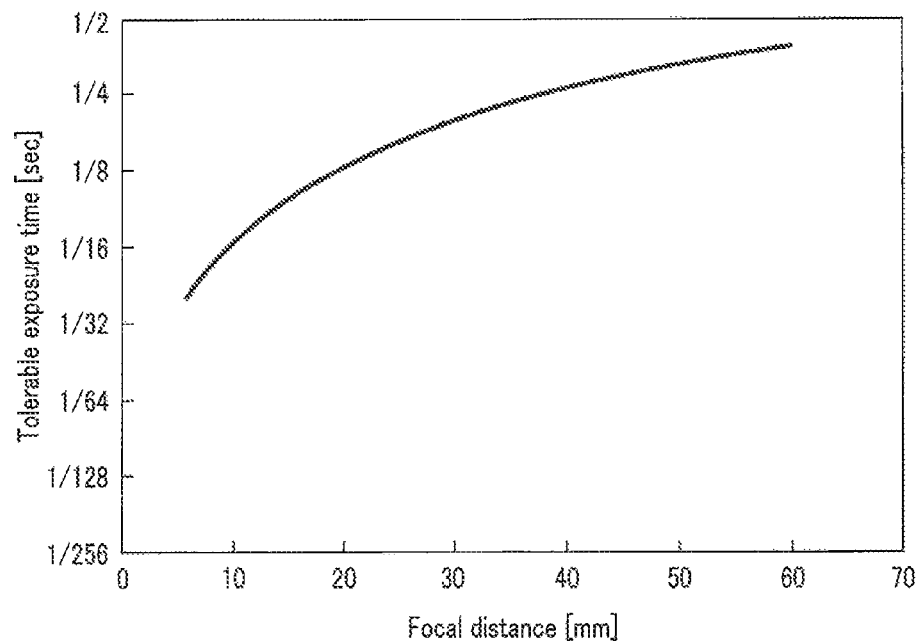
F I G. 12
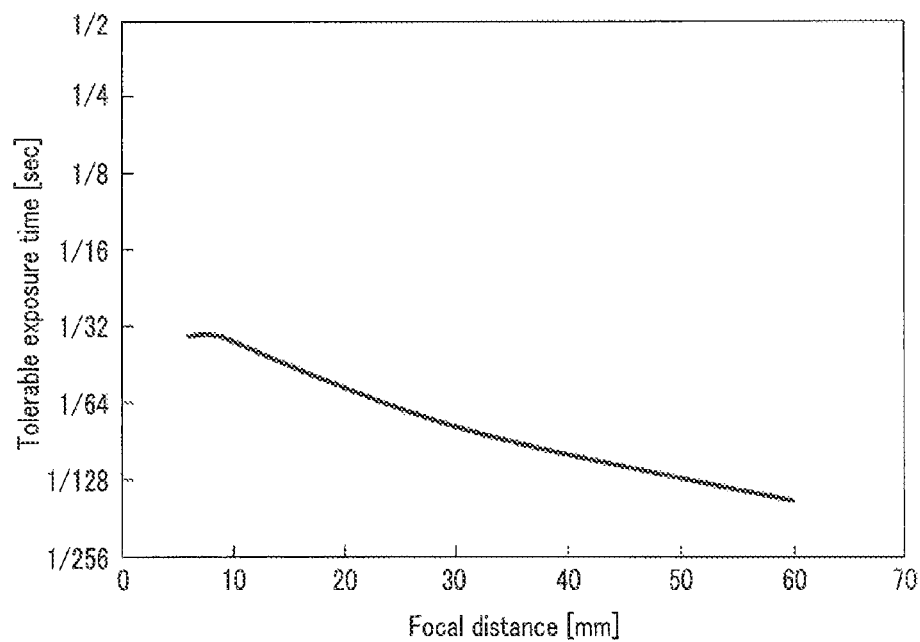
F I G. 13

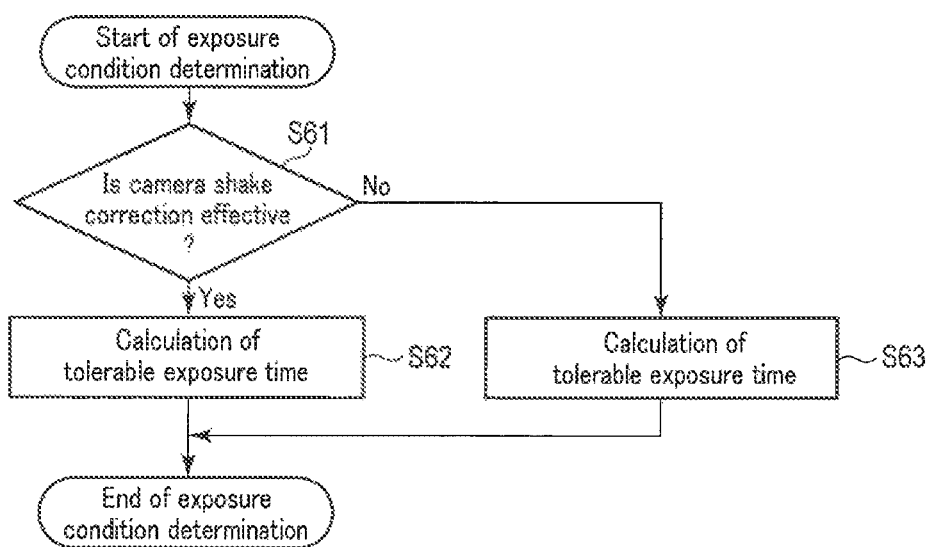
F I G. 17

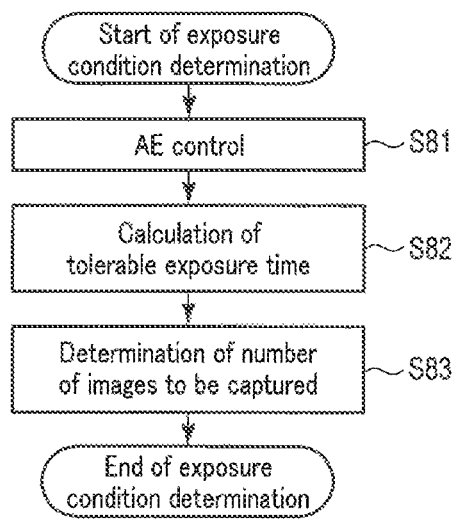
F I G. 20

IMAGE PICKUP APPARATUS AND IMAGE PICKUP METHOD

CROSS-REFERENCE TO RELATED APPLICATIONS

This application is based upon and claims the benefit of priority from the prior Japanese Patent Application No. 2016-112755, filed Jun. 6, 2016, the entire contents of which are incorporated herein by reference.

FIELD

The present invention relates to an image pickup apparatus and an image pickup method.

BACKGROUND

An image pickup apparatus has been put to practical use, which detects an amount of image blur (image movement amount) of a subject image on an imaging plane, which occurs due to a change of an attitude of the image pickup apparatus, and cancels the detected image movement amount. This image pickup apparatus corrects the image blur due to the change of the attitude of the image pickup apparatus, for example, by optical image blur correction which corrects a positional relationship between the imaging plane and the subject image by a mechanical mechanism, or by electronic image blur correction which changes an effective area in image data.

The optical image blur correction includes some methods, for example, lens shift type image blur correction and image sensor shift type image blur correction, which are disclosed in Jpn. Pat. Appln. KOKAI Publication No. 2014-053720 (patent document 1). In the lens shift type image blur correction, image blur is corrected by an imaging lens including a correction optical system which is configured to be movable in such a direction as to cancel image blur. In the image sensor shift type image blur correction, image blur is corrected by an imaging element including an imaging plane which is configured to be movable in a direction perpendicular to the optical axis of the imaging lens.

SUMMARY

According to one embodiment, an image pickup apparatus includes an imaging element, a body, a reception circuit, an imaging control circuit, an attitude detection circuit, a keystone correction circuit, and a composite circuit. The imaging element includes an imaging plane on which pixels configured to convert light to an electric signal are arrayed. The body is configured to hold the imaging element. The reception circuit is configured to receive an optical characteristic of an image pickup optical system configured to form a subject image on the imaging plane. The imaging control circuit is configured to acquire a plurality of first images corresponding to the subject image formed on the imaging plane by the image pickup optical system by causing the imaging element to execute exposure a plurality of times in accordance with an imaging instruction that is input. The attitude detection circuit is configured to detect a tilt angle each time exposure is executed, the tilt angle being a change amount of an attitude of the body from a preset reference attitude in a direction with a rotational axis along a direction perpendicular to an optical axis of the image pickup optical system. The keystone correction circuit is configured to correct a keystone distortion occurring in each of the plurality of first images due to a change of the attitude of the body, by keystone correction based on the tilt angle corresponding to each of the first images, and the optical characteristic, thereby generating a plurality of second images. The composite circuit is configured to generate a third image by compositing the plurality of second images.

According to the present invention, there can be provided an image pickup apparatus and an image pickup method, which can suppress an image blur remnant at an image peripheral part at a time of image blur correction in wide-angle imaging.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 is a view for explaining examples of images in a case of capturing a subject image formed on the imaging plane by the optical system of central projection.

FIG. 5 is a view for explaining example of images in a case of capturing a subject image formed on the imaging plane by the optical system of central projection.

FIG. 8 is a view for explaining the function of a blur correction microcomputer of the image pickup apparatus according to the first embodiment.

FIG. 9 is a view for explaining an example of the operation of the image pickup apparatus according to the first embodiment.

FIG. 10 is a view for explaining an example of the operation of the image pickup apparatus according to the first embodiment.

FIG. 12 is an explanatory view for explaining a relationship between a focal distance and a tolerable exposure time in a case in which camera shake correction is effective in the image pickup apparatus according to the first embodiment.

FIG. 13 is an explanatory view for explaining a relationship between the focal distance and tolerable exposure time in a case in which the camera shake correction is not effective in the image pickup apparatus according to the first embodiment.

FIG. 17 is a view for explaining an example of the operation of the image pickup apparatus according to the third embodiment.

FIG. 20 is a view for explaining an example of the operation of the image pickup apparatus according to the fourth embodiment.

DETAILED DESCRIPTION

Hereinafter, an image, pickup apparatus 1 according to an embodiment will be described in detail with reference the accompanying drawings.

To begin with, the principle of occurrence of image blur, which occurs due to a change of an attitude of the image pickup apparatus 1, is described.

Figure 1:
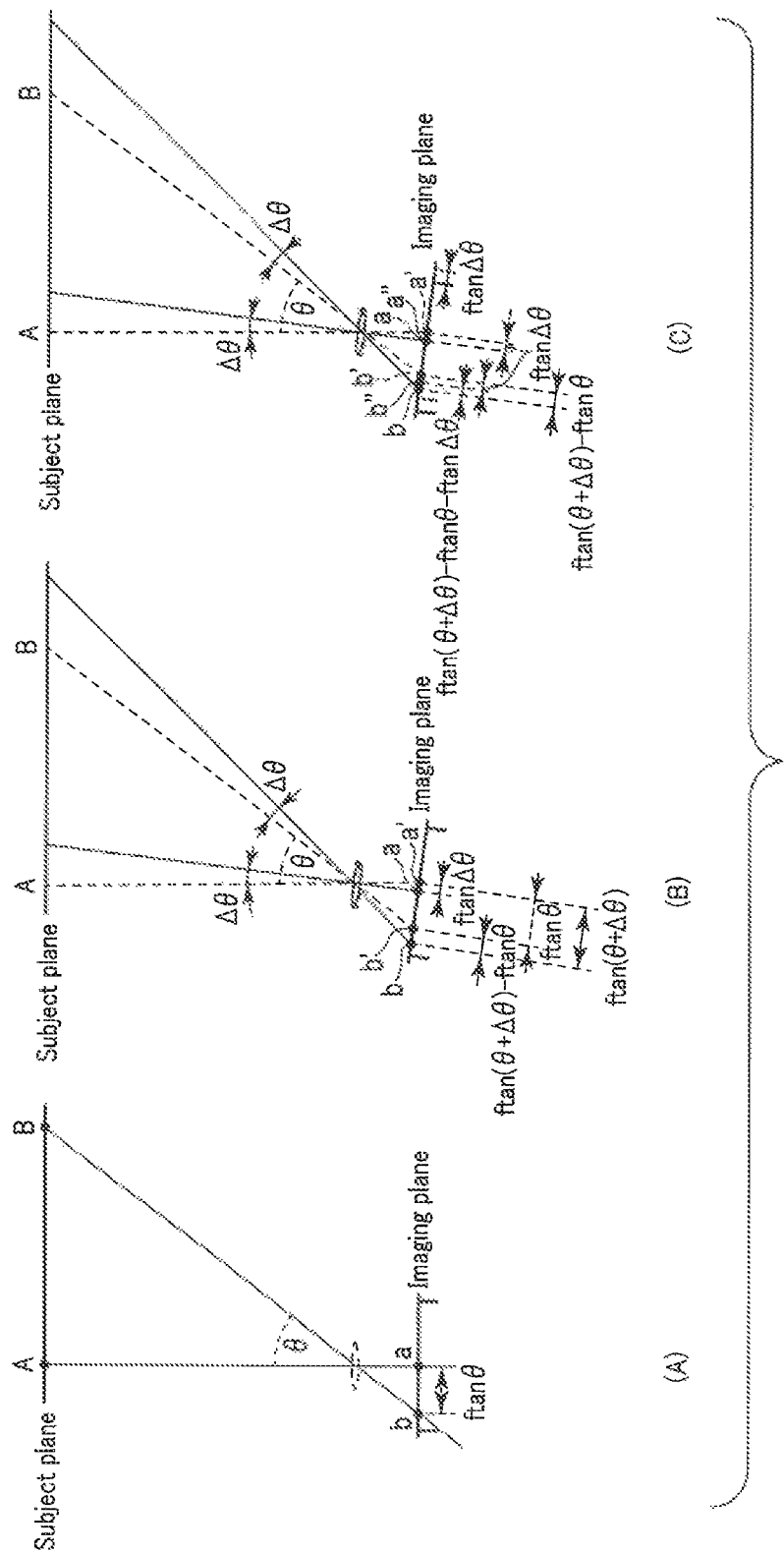
FIG. 1 is a view for explaining a relationship between an incidence angle of light, which is incident on an optical system of a central projection method, and an image height of a subject image which is formed on an imaging plane of an imaging element by this light.

FIG. 1 is a view illustrating a relationship between an incidence angle of light, which is incident on an optical system of a central projection method, and an image height of a subject image which is formed on an imaging plane of an imaging element by this light (a distance from an image center position at which an image of a light ray passing through the optical axis (optical center) of the optical system is formed). Part (A) of FIG. 1 illustrates a relationship between an incidence angle and an image height in a case in which no change occurs in attitude of the image pickup apparatus 1. Part (B) of FIG. 1 illustrates a relationship between an incidence angle and an image height in a case in which a change occurs in attitude of the image pickup apparatus 1. Part (C) of FIG. 1 illustrates an example of a case in which image blur of a subject image, which occurs on an imaging plane due to a change in attitude of the image pickup apparatus 1, is suppressed by shifting the imaging plane.

As illustrated in part (A) of FIG. 1, a case is assumed in which a focal distance is f, a subject exists at coordinates A overlapping with the optical axis of the optical system, a subject exists at coordinates B on a straight line which forms an angle θ relative to the optical axis of the optical system, the coordinates on the imaging plane, at which the image of the subject at the coordinates A is formed, are defined as a, and the coordinates on the imaging plane, at which the image of the subject at the coordinates B is formed, are defined as b. In this case, an image height, which is a distance a-b between the coordinates a and coordinates b, is expressed as f tan θ.

As illustrated in part (B) of FIG. 1, when a change (angular shake) in attitude of Δθ occurred in the image pickup apparatus 1, the coordinates a move to coordinates a', and the coordinates b move to coordinates b'.

As illustrated in part (C) of FIG. 1, the imaging plane is shifted in accordance with the change (angular shake) in attitude of Δθ occurred in the image pickup apparatus 1. Thereby, the subject image of the subject of the coordinates A moves to coordinates a" on the imaging plane, and the subject image of the subject of the coordinates B moves to coordinates b" on the imaging plane.

When an image movement amount from the coordinates a to coordinates a' is a-a', an image movement amount from the coordinates b to coordinates b' is b-b', an image movement amount from the coordinates a to coordinates a", which is an image movement amount after image blur correction, is a-a", and an image movement amount from the coordinates b to coordinates b", which is an image movement amount after image blur correction, is b-b", the respective movement amounts can be expressed by the following mathematical expression 1.

$$a\text{-}a' = f \tan \Delta\theta$$

$$b\text{-}b' = f \tan(\theta + \Delta\theta) - f \tan \theta$$

$$a\text{-}a'' = f \tan \Delta\theta - f \tan \Delta\theta = 0$$

$$b\text{-}b'' = f \tan(\theta + \Delta\theta) - f \tan \theta - f \tan \Delta\theta \quad \text{(mathematical expression 1)}$$

By simply shifting the imaging plane in accordance with the angular shake Δθ as described above, it is possible to correct, the imaging plane, the image blur at the image center position at which an image of a light ray passing through the optical axis is formed. However, in a peripheral part of the imaging plane, it is possible that the correction amount of image blur by the shift of the imaging plane is insufficient, and image blur remains. Specifically, even if the image movement amount a-a" becomes zero, the image movement amount b-b" does not become zero.

When b-b", which is an image movement amount at a peripheral part of the imaging plane, is defined as an image blur remnant amount Δλ, and a-b=f tan θ, which is a distance between the coordinates a and coordinates b, is, defined as an image height λ at the coordinates b, Δλ can be expressed by the following mathematical expression 2 by the addition theorem of tangent, $$\Delta\lambda = f\tan(\theta + \Delta\theta) - f\tan\theta - f\tan\Delta\theta \quad \text{(mathematical expression 2)}$$

$$= f\left[\frac{\tan\theta\tan\Delta\theta(\tan\theta + \tan\Delta\theta)}{1 - \tan\theta\tan\Delta\theta}\right]$$

Here, when Δθ≈0, tan Δθ=Δθ. Thus, based on tan θ=λ/f, which is a modification of λ=f tan θ, Δλ can be expressed by the following mathematical expression 3.

$$\Delta\lambda = \lambda^2 \Delta\theta / f \quad \text{(mathematical expression 3)}$$

Figure 2:
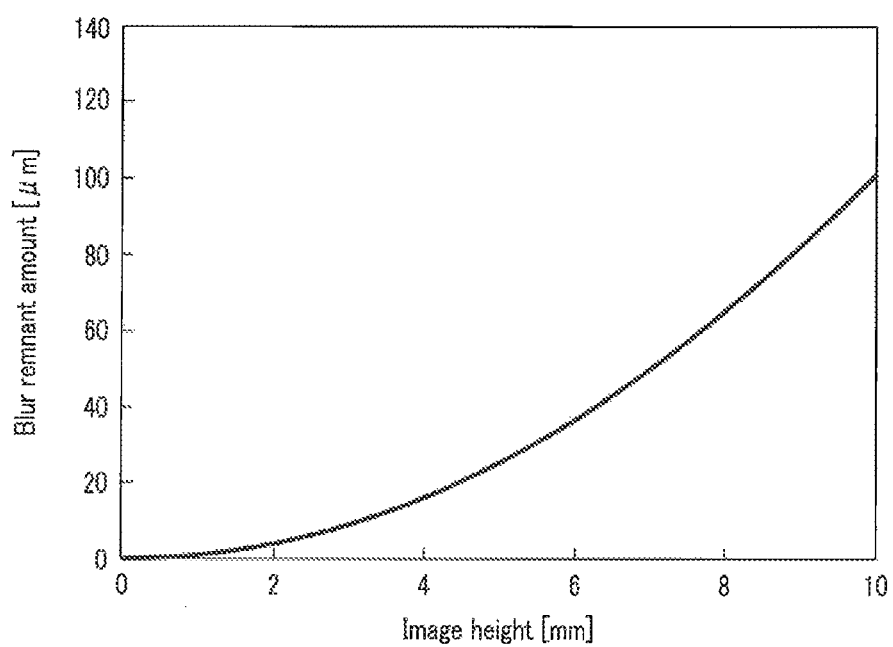
FIG. 2 is a view for explaining a relationship between the image height and an image blur remnant amount in a case in which image blur occurring in accordance with a change of an attitude of an image pickup apparatus was corrected by shifting the imaging plane.

FIG. 2 is a view illustrating a relationship between the image height and the image blur remnant amount in a case in which image blur occurring in accordance with a change of the attitude of the image pickup apparatus. 1 was corrected by shifting the imaging plane. In the meantime, the graph of FIG. 2 illustrates the relationship between the image height and the image blur remnant amount in the case in which a change in attitude of Δθ=0.7° occurred in the image pickup apparatus 1, with respect to a subject image which is formed on an imaging element, whose imaging plane has a size of 17.3 mm×13 mm, by an optical system having a focal distance f of 12 mm. To be more specific, the graph of FIG. 2 illustrates the relationship between the image height and image blur remnant amount in the case in which the imaging plane was shifted such that the image movement amount at the position, where the image height=0, becomes 0. As illustrated in FIG. 2, the image blur remnant amount increases in accordance with the image height.

Figure 3:
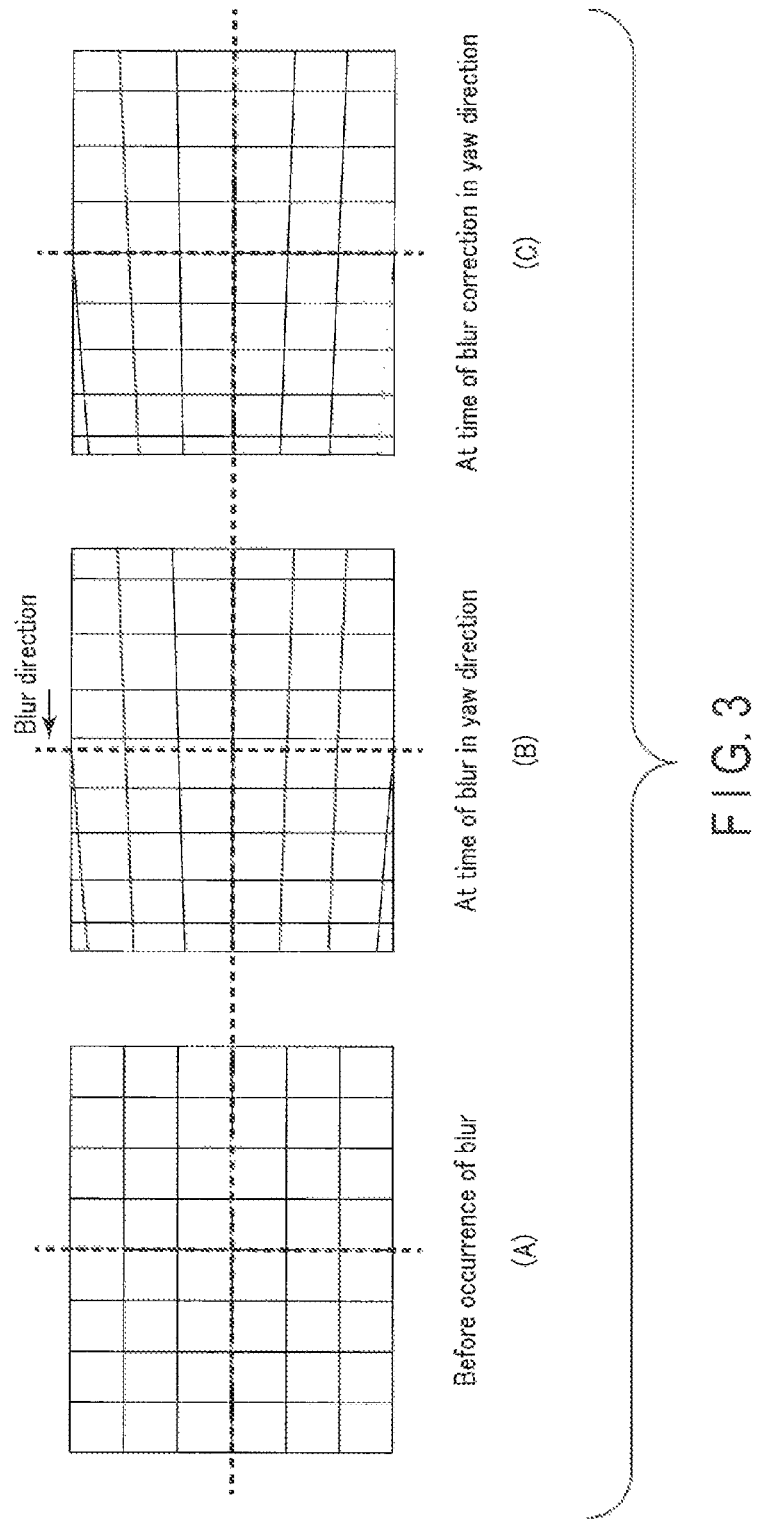
FIG. 3 is a view for explaining examples of images in a case of capturing a subject image formed on the imaging plane by the optical system of a central projection method.

FIG. 3 to FIG. 5 illustrate examples of images in cases of capturing subject images formed on the imaging plane by the above-described optical system of the central projection method.

Part (A) of FIG. 3 illustrates an example of an image in a case in which no chancre occurs in attitude of the image pickup apparatus 1. Part (B) of FIG. 3 illustrates an example of an image in a case in which the attitude of the image pickup apparatus 1 has changed in a direction (yaw direction) around a yaw axis which is a first direction perpendicular to the optical axis of the optical system, from the attitude at a time when the image of part (IQ of FIG. 3 was captured. Part (C) of FIG. 3 illustrates an example of an image captured by the imaging plane which was shifted in accordance with the change of the attitude in the yaw direction, of the image pickup apparatus 1. Specifically, part (C) of FIG. 3 illustrates an example of an image in a case in which image blur correction was made by the sensor shift method.

Part (A) of FIG. 4 illustrates an example of an image in a case in which no change occurs in attitude of the image pickup apparatus 1. Part (B) of FIG. 4 illustrates an example of an image in a case in which the attitude of the image pickup apparatus 1 has changed in a direction (pitch direction) around a pitch axis which is a second direction perpendicular to the optical axis and yaw axis of the optical system, from the attitude at a time when the image of part (A) of FIG. 4 was captured. Part (C) of FIG. 4 illustrates an example of an image captured by the imaging plane which was shifted in accordance with the change in attitude in the pitch direction of the image pickup apparatus 1. Specifically, part (C) of FIG. 4 illustrates an example of an image in a case in which image blur correction was made by the sensor shift method.

Part (A) of FIG. 5 illustrates an example of an image in a case in which no change occurs in attitude of the image pickup apparatus 1. Part (B) of FIG. 5 illustrates an example of an image in a case in which the attitude of the image pickup apparatus 1 has changed in the Pitch direction and yaw direction, from the attitude at a time when the image of part (A) of FIG. 5 was captured. Part (C) of FIG. 5 illustrates an example of an image captured by the imaging plane which was shifted in accordance with the change in attitude in the pitch direction and yaw direction of the image pickup apparatus 1. Specifically, part (C) of FIG. 5 illustrates an example of an image in a case in which image blur correction was made by the sensor shift method.

An optical system for normal photography is based on a Principle in which a subject image is formed on an imaging plane by central projection. Thus, as indicated by the mathematical expression 3, the image blur remnant amount $\Delta\lambda$ at the peripheral part increases in proportion to the square of the image height $\lambda$ from the image center position at which the light ray passing through the optical center forms an image. Hence, as the focal distance of the optical system becomes shorter, the image movement amount of the subject image, which occurs at a predetermined image height from the optical center on the imaging plane, becomes greater relative to the image movement amount at the optical center. In this manner, the image movement amount is not uniform on the entirety of the screen. Thus, for example, when the attitude of the image pickup apparatus 1 has changed in the yaw direction and/or the pitch direction, a keystone distortion, in which the subject image deforms in a trapezoidal shape, occurs as illustrated in part (B) of FIG. 3, Part (B) of FIG. 4 and part (B) of FIG. 5. As illustrated in part (C) of FIG. 3, part (C) of FIG. 4 and part (C) of FIG. 5, such keystone distortion is not completely corrected even if the imaging plane is shifted, and there remains peripheral image blur, which is an image blur correction remnant at a peripheral part.

First Embodiment

Figure 6:
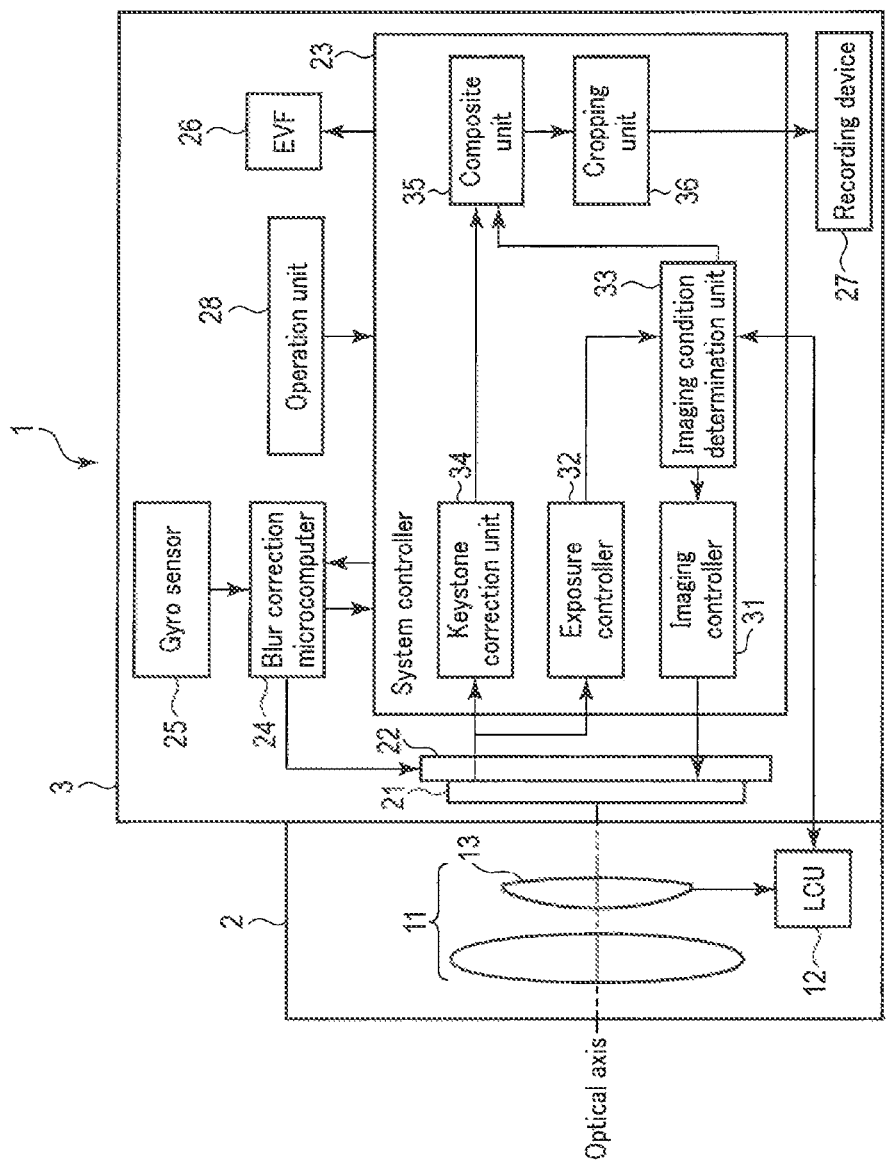
FIG. 6 is a view for explaining an example of the configuration of an image pickup apparatus according to a first embodiment.

FIG. 6 illustrates a configuration example of the image pickup apparatus 1 according to a first embodiment. The image pickup apparatus 1 is a lens interchange type camera in which an image blur correction device is mounted. The image pickup apparatus 1 includes an interchangeable lens 2 and a camera body 3. The image pickup apparatus 1 keystone-corrects a plurality of images acquired by executing exposure a plurality of times with an exposure time which is shorter than an exposure time that is determined based on a photometry result or the like in accordance with a one-time imaging instruction, and composites the keystone-corrected images. Thereby, the image pickup apparatus 1 executes imaging in which image deformation due to keystone distortion of a photographed image is corrected, and image blur is properly corrected even at an image peripheral part.

The interchangeable lens 2 is configured to be attachable/detachable to/from the camera body 3. When the interchangeable lens 2 is attached to the camera body 3, the interchangeable lens 2 and camera body 3 are mutually communicably connected. Thereby, the interchangeable lens 2 and the camera body 3 operate cooperatively. The interchangeable lens 2 includes an optical system 11 and a lens control unit (LCU) 12.

The optical system 11 is an imaging lens of a central projection method. The optical system 11 forms an image of light flux from a subject (not shown) on an imaging plane of an imaging element 21 of the camera body 3. The optical system 11 includes, for example, a plurality of lenses, an aperture for adjusting the amount of light flux which is incident on the imaging element 21 via the lenses, and a lens (zoom lens) 13 for varying a focal distance of the optical system 11. The optical system 11 varies the focal distance (angle of view) of the optical system 11 by moving the position of the zoom lens 13 in the optical axis direction of the optical system 11. Furthermore, the optical system 11 may be configured to further include a focus lens for focusing for varying the focal position. The LOU 12 is a controller which includes, for example, a CPU and a memory, and controls the operation of the interchangeable lens 2. For example, the LOU 12 controls the driving of the lenses and aperture of the optical system 11 in accordance with an instruction from a system controller 23 of the camera body 3. In addition, in accordance with an instruction from the system controller 23, the LOU 12 may vary the angle of view of the optical system 11 by varying the position of the zoom lens 13.

The LCU 12 stores, in a memory, various pieces of information (optical characteristic information) relating to the interchangeable lens 2. The LCU 12 stores in the memory, for example, as optical characteristic information, the model name of the interchangeable lens 2, a focal distance, a projection method, distortion correction information, and information indicative of the present setting of the optical system 11. The LCU 12 supplies the optical characteristic information, which is stored in the memory, to the camera body 3 in accordance with an instruction from the system controller 23.

The camera body 3 includes the imaging element 21, a blur correction unit 22, the system controller 23, a blur correction microcomputer 24, a gyro sensor 25, an electronic view finder (EVF) 26, a recording device 27, and an operation unit 28.

The imaging element 23 includes an imaging plane which is composed such that a Plurality of pixels, which photoelectrically convert light and accumulate electric charge, are arranged. The imaging element 21 is held in the camera body 3. The imaging element 21 is composed of, for example, a charge-coupled device (COD) image sensor, a complementary metal oxide semiconductor (CMOS) image sensor, or some other imaging element. The imaging element 12 converts a subject image, which is formed on the imaging plane by the optical system 11, to an electric signal (image signal). The imaging element 21 converts the image signal, which is an analog electric signal, to image data which is a digital signal, and outputs the image data.

The blur correction unit 22 moves the imaging plane of the imaging element 21 within a plane perpendicular to the optical axis of the optical system 11 in accordance with a driving signal which is generated by the blur correction microcomputer 24, thereby correcting image blur of the subject image on the imaging plane, which occurs due to a change of the attitude of the image pickup apparatus 1.

The system controller 23 is a controller which includes, for example, a CPU and a memory, and controls the operation of the camera body 3. For example, the system controller 23 reads out image data acquired by the imaging element 21, and applies various image processes, which are necessary for display or storage, to the read-out image data. In addition, the system controller 23 instructs the LCU 12 of the interchangeable lens 2 to drive the aperture for exposure adjustment, or to drive the lens for focal adjustment. Furthermore, the system controller 23 executes control of image display in the EVF 26, control of storage of image files in the recording device 27, control to switch the operation mode in accordance with the operation of the operation unit 28, and control to start or stop the imaging operation.

In addition, the system controller 23 functions as an information acquisition unit which acquires optical characteristic information from the interchangeable lens Specifically, the system controller 23 is a reception circuit which receives an optical characteristic of the interchangeable lens 2 which forms a subject image on the imaging plane. For example, the system controller 23 acquires optical characteristic information from the interchangeable lens 2 at a time of activation and/or periodically, thereby recognizing the optical characteristic of the interchangeable lens 2 at each time. The system controller 23 inputs the acquired optical characteristic information to the blur correction microcomputer 24.

Besides, the system controller 23 includes an imaging controller 31, an exposure controller 32, an imaging condition determination unit 33, a keystone correction unit 34, a composite unit 35, and a cropping unit 36. The imaging controller 31, exposure controller 32, imaging condition determination unit 33, keystone correction unit 34, composite unit 35 and cropping unit 36 may be provided as hardware such as circuitry in the system controller 23, or may be composed of programs which the CPU of the system controller 23 reads out from the memory.

The imaging controller 31 causes the imaging element 21 to execute exposure in accordance with an imaging instruction which is input, and acquires a plurality of images (first images) corresponding to a subject image which is formed on the imaging plane of the imaging element 21 by the optical system 11. For example, the imaging controller 31 causes the imaging element 21 to execute exposure a plurality of times in accordance with a one-time imaging instruction, and acquires a plurality of first images corresponding to the subject image which is formed on the imaging plane of the imaging element 21 by the optical system 11. In addition, the imaging controller 31 may be configured to cause the imaging element 21 to execute exposure a plurality of times with a predetermined exposure time from when an imaging start instruction as an imaging instruction is input to when an imaging end instruction as an imaging instruction is input, and to acquire a plurality of first images.

The exposure controller 32 measures brightness information which indicates a brightness of the subject image, based on the subject image formed on the imaging plane, and determines an exposure time (total exposure time) which is necessary for making proper the brightness of the subject, based on the brightness information. In addition, the exposure controller 32 may be configured to set an aperture value and/or a sensitivity of the imaging element 21, based on the brightness information. Incidentally, the aperture value, the sensitivity of the imaging element 21, and the exposure time may be values which are manually set.

The imaging condition determination unit 33 determines imaging conditions including the exposure time of the imaging element 21 and the number of images to be captured, based on the focal distance of the optical system 11, which is included in the optical characteristics that the system controller 23 acquired from the LCU 12. For example, the imaging condition determination unit 33 determines a divisional exposure time which is a one-time exposure time, based on the focal distance of the optical system 11, which is included in the optical characteristics that the system controller 23 acquired from the LCU 12, and determines the number of images to be captured, based on the total exposure time determined by the exposure controller 32 and the divisional exposure time.

Figure 7:
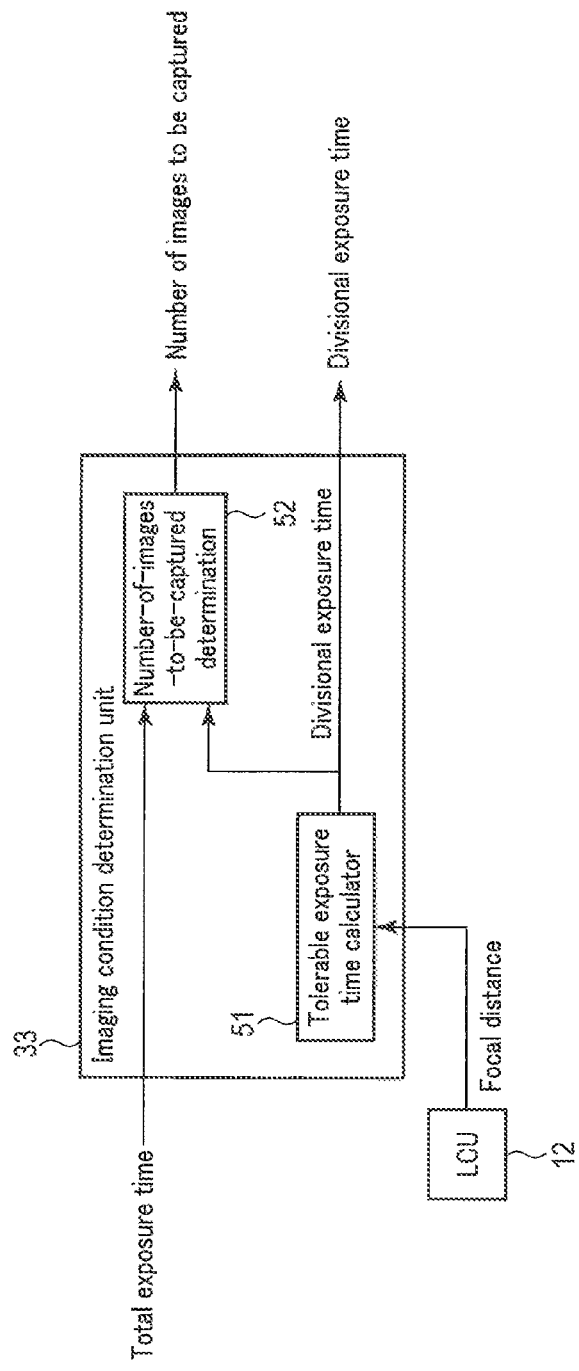
FIG. 7 is a view for explaining the function of an imaging condition determination unit of the image pickup apparatus according to the first embodiment.

FIG. 7 is a block diagram illustrating, as blocks, functions of the imaging condition determination unit 33. The imaging condition determination unit 33 includes a tolerable exposure time calculator 51 and a number-of-images-to-be-captured determination unit 52. The tolerable exposure time calculator 51 calculates, based on the focal distance, a tolerable exposure time which is an exposure time for making image blur fall within a tolerable range. The tolerable exposure time calculator 51 sets the tolerable exposure time as the divisional exposure time. Incidentally, if the tolerable exposure time calculator 51 is configured to set an exposure time, which is shorter than the tolerable exposure time, as the divisional exposure time, the tolerable exposure time calculator 51 may be configured, to set any time as the divisional exposure time. The number-of-images-to-be-captured determination unit 52 judges how many first images, which are acquired when exposure is executed with the divisional exposure time, correspond to the total exposure time, and determines the number of images to be captured. For example, the imaging condition determination unit 33 determines the number of images to be captured, by dividing the total exposure time by the divisional exposure time.

The keystone correction unit 34 executes keystone correction of a distortion which occurs in each of the first images due to a change of the attitude of the camera body 3, based on the attitude of the camera body 3 with respect to each of the first images, and generates second images. The operation of the keystone correction unit 34 will be described later in detail.

The composite unit 35 composites a plurality of second images by making the centers thereof coincident, and generates a third image. At this time, if the blur correction unit 22 is constantly operated during photographing the first images, the image at the center of the imaging plane is held at a fixed subject. Thus, the composite unit 35 may be configured to composite the images by simply making coincident the centers (center of angle of view) of the images, without performing particular alignment.

Incidentally, the composite unit 35 may be configured to detect a positional displacement of images by a method such as pattern matching, and to composite the images by performing alignment of the detected displacement. According to this configuration, for example, even when such a large image blur that the image blur at the image center position cannot completely be corrected by the blur correction unit 22 occurs during a series of imaging operations, a third image is obtained by a composite process by correcting the positional displacement between plural images by the alignment. Thereby, an image blur correction effect with higher precision, can be obtained.

The composite unit 35 can obtain the third image by compositing the plural second images by using various conventional image composite methods. For example, the composite unit 35 acquires the third image by compositing plural second images by averaging compositing which averages output values of pixels of plural second images with respect to each of coordinates.

In addition, for example, the composite unit 35 may be configured to acquire the third image by compositing plural second images by addition compositing which adds output values of pixels of plural second images with respect to each of coordinates.

Furthermore, in another example of processing, the composite unit 35 may be configured to acquire the third image by compositing plural second images by comparative brightness compositing, which compares output values of pixels of plural second images with respect to each of coordinates, and adopts a higher brightness value. By executing the comparative brightness compositing, the composite unit 35 compares output values of pixels of plural second images with respect to each of coordinates, and adopts an output value of a brighter pixel as an output value of a pixel in the image after compositing.

The cropping unit 36 crops a rectangular image from the third image. The second image includes an area in which no image information exists, when keystone correction was executed from the first image. The cropping unit 36 sets, as a cropping range, a rectangular area which does not include the area in which no image information exists in the second images, and crops an image from the third image in the set cropping range. The system controller 23 stores the cropped image in the recording device 27.

The blur correction microcomputer 24 is a microcomputer which executes control relating to image blur correction. The blur correction microcomputer 24 acquires an angular velocity signal from the gyro sensor 25, and acquires optical characteristic information of the interchangeable lens 2 from the system controller 23. The blur correction microcomputer 24 corrects image blur by controlling the blur correction unit 22, based on the acquired angular velocity signal and optical characteristic information. For example, the blur correction microcomputer 24 calculates the direction of image blur of the subject image on the imaging plane and the image movement amount, based on the acquired angular velocity signal and optical characteristic information. Specifically, the blur correction microcomputer 24 functions as an image blur detection sensor.

The blur correction microcomputer 24 corrects image blur by controlling the blur correction unit 22 so as to move the imaging plane in such a direction as to cancel image blur in accordance with the calculated direction of image blur and image movement amount. Specifically, the blur correction microcomputer 24 corrects image blur by adjusting the positional relationship between the subject image formed on the imaging plane by the optical system 11 and the imaging plane. In short, the blur correction microcomputer 24 and blur correction unit 22 function as a blur correction actuator.

The gyro sensor 25 detects, as an angular velocity signal, a rotational movement of the camera body 3 occurring due to a change of the attitude of the camera body 3. To be more specific, the gyro sensor 25 detects, as angular velocity signals, a change of the attitude of the camera body 3 in the direction (yaw direction) around the yaw axis which is the first direction perpendicular to the optical axis of the optical system 11, and a change of the attitude of the camera body 3 in the direction (pitch direction) around the pitch axis which is the second direction perpendicular to the optical axis and yaw axis of the optical system 11.

The blue correction microcomputer 24 functions as an attitude detector which detects a tilt angle which is a change amount of the attitude of the camera body 3 from a preset reference attitude, in accordance with the angular velocity signals detected by the gyro sensor 25. Specifically, the blur correction microcomputer 24 and gyro sensor 25 function as an attitude detection sensor which detects the tilt angle. For example, the blur correction microcomputer 24 detects the tilt angle as a change amount from the reference attitude of the camera body 3 at each of several times of exposure, the reference attitude being the attitude of the camera body 3 at a time when first exposure was executed from the input of the imaging instruction.

The EVF 26 is a display unit which displays various screens. The EVF 26 includes a display device such as a liquid crystal display or an organic EL display. The EVF 26 displays on the display device a screen which is generated by the system controller 23. Thereby, the EVF 26 can display on the display device an image captured by the imaging element 21, and a menu screen for settings. Incidentally, the EVF 26 may be configured to further include an eyepiece optical system which is provided in a finder eyepiece unit, and to enable the user to visually recognize the display device via the eyepiece optical system.

The recording device 27 is a recording device which stores image files. The recording device 27 is, for example, a memory card.

The operation unit 28 includes an operation member which is operated by the user. For example, the operation unit 28 includes a release button as the operation member. The release button is a button configured to deliver the above-described imaging instruction to the system controller 23 in accordance with the operation, and to execute a still image photography process by the camera body 3. Furthermore, the operation unit 28 may include, as the operation member, a button for changing the operation mode of the camera body 3, or changing various settings such as exposure control. For example, the operation unit 28 may include, as the operation members, buttons for changing the setting of execution/non-execution of keystone correction, the setting of execution/non-execution of peripheral image blur correction imaging, the setting of a composite method, and the setting of the size of a cropping area.

Next, the details of the blur correction microcomputer 24 will be described. FIG. 8 is a view illustrating an example of the configuration of the blur correction microcomputer 24. As illustrated in FIG. 8, the blur correction microcomputer 24 includes an analog-to-digital converter (ADC) 41, a reference value subtraction unit 42, a multiplication unit 43, an integration unit 44, and a correction amount output unit 45. By the configuration illustrated in FIG. 8, the control of image blur correction in one direction in the imaging plane can be executed. Specifically, the blur correction microcomputer 24 includes the configuration illustrated in FIG. 8 with respect to each of directions in which image blur correction is made, and thereby the control of image blur correction in plural directions can be executed. Here, for the purpose of simple description, a description is given of the control of image blur correction in one direction by the blur correction microcomputer 24.

The ADC 41 converts an analog angular velocity signal, which is output from the gyro sensor 25, to a digital signal, and outputs a digital angular velocity signal.

The reference value subtraction unit 42 subtracts an angular velocity reference value from a value of the angular velocity signal that is output from the ADC 41. The angular velocity reference value is a value of an angular velocity signal at a time when the camera body 3 is at rest. By subtracting the angular velocity reference value from the output of the ADC 41, the reference value subtraction unit 42 outputs a value of angular velocity with a sign. At this time, the sign of the value of angular velocity indicates a rotational direction.

The multiplication unit 43 multiplies the output (the value of angular velocity with the sign) of the reference value subtraction unit 42 by an optical characteristic. Specifically, the multiplication unit 43 multiplies the output of the reference value subtraction unit 42 by a coefficient corresponding to the focal distance of the optical system 11, thereby calculating the image movement amount in the imaging Plane and the direction of movement of the image.

The integration unit 44 integrates the output of the multiplication unit 43, thereby calculating the image movement, amount per unit time. For example, the integration unit 44 executes the integration based on a detection result during the exposure time, thereby calculating the image movement amount occurring during the exposure time.

The correction amount output unit 45 generates a driving signal for operating the blur correction unit 22 so as to cancel the image blur of the subject image. Specifically, the correction amount output unit 45 calculates a driving amount of the imaging plane of the imaging element 21 for canceling the image movement, based on the image movement amount calculated by the integration unit 44, and generates and outputs, based on this driving amount, the driving signal for driving the blur correction unit 22. The driving signal is a driving pulse for driving a motor provided in the blur correction unit 22, or a signal including information such as a target driving position of image blur correction by the blur correction unit 22.

FIG. 9 is a flowchart illustrating the operation of the image pickup apparatus 1 at a time of performing peripheral image blur correction imaging. Incidentally, although FIG. 9 illustrates the operation relating to the peripheral image blur correction imaging, the control relating to camera shake correction and a process such as photometry are being executed in parallel. The system controller 23 executes the process of FIG. 9, when an imaging instruction is input.

The system controller 23 judges whether or not to execute peripheral image blur correction (step S11). Specifically, the system controller 23 functions as a keystone correction execution determination unit which judges whether or not to suppress peripheral image blur by executing keystone correction. For example, the system controller 23 judges whether or not to execute peripheral image blur correction, based on the information which the optical characteristic obtained in advance from the LCU 12 indicates. Specifically, the system controller 23 determines the execution of the peripheral image blur correction, when the optical characteristic obtained in advance from the LOU 12 indicates a focal distance which is shorter than the preset focal distance, and when the projection method is central projection. In the meantime, the system controller 23 may calculate, at each time, the total exposure time by executing photometry by the exposure controller 32, and may determine the execution of peripheral image blur correction when the calculated total exposure time is longer than a preset tolerable exposure time. The tolerable exposure time is indicative of an exposure time in which image blur at a time of exposure can be suppressed. The tolerable exposure time may be fixed, or may be calculated by the system controller 23 based on the focal distance of the optical system 11.

In the meantime, the system controller 23 may be configured to judge whether or not to execute peripheral image blur correction, based on at least one of the focal distance indicated by the optical characteristic and the projection method.

If it is judged that the peripheral image blur correction is to be executed (step S11, YES), the system controller 23 determines the divisional exposure time and the number of images to be captured, as exposure conditions, by the exposure controller 32 and imaging condition determination unit 33 (step S12).

FIG. 10 is a flowchart illustrating the operation of the image pickup apparatus 1 at a time of executing the exposure condition determination process. For example, the system controller 23 calculates the total exposure time, the sensitivity of the imaging element 21 and the aperture value by executing automatic exposure process (AE process) by the exposure controller 32 (step S21).

The imaging condition determination unit 33 judges whether camera shake correction by the blur correction unit 22 is effective or not (whether camera shake correction is executed or not) (step S22). If the imaging condition determination unit 33 judges that camera shake correction by the blur correction unit 22 is effective (step S22, YES), the imaging condition determination unit 33 calculates a tolerable exposure time at a time when the camera shake correction is effective, based on brightness information that is a result of photometry, a movement amount of the imaging plane by the camera shake correction, and the focal distance of the optical system 11, and determines a divisional exposure time which is shorter than this tolerable exposure time (step S23). Furthermore, the imaging condition determination unit 33 determines the number of images to be captured, based on the total exposure time and divisional exposure time (step S24).

If the imaging condition determination unit 33 judges that camera shake correction by the blur correction unit 22 is not effective (step S22, NO), the imaging condition determination unit 33 calculates a tolerable exposure time at a time when the camera shake correction is not effective, based on brightness information that is a result photometry, and the focal distance of the optical system 11, and determines a divisional exposure time which is shorter than this tolerable exposure time (step S25). Furthermore, the imaging condition determination unit 33 determines the number of images to be captured, based on the total exposure time and divisional exposure time (step S24).

As described above, by setting the camera shake correction to be effective, the imaging condition determination unit 33 can increase the tolerable exposure time, and can decrease the number of images to be captured. Thus, the processing load for keystone correction and compositing can be reduced.

Next, as illustrated in FIG. 9, in accordance with the processing result of step S12, the system controller 23 causes, by the imaging controller 31, the imaging element 21 to execute exposure, and performs image readout (step S13). Specifically, the imaging controller 31 causes the imaging element 21 to execute exposure in accordance with the divisional exposure time determined by the imaging condition, determination unit 33, and acquires first images. In addition, at this time, the system controller 23 acquires the tilt angle which is calculated by the blur correction microcomputer 24.

The system controller 23 inputs to the keystone correction unit 34 the first images and the tilt angle of the camera body 3 at the time of the exposure of the first images, and keystone-corrects the first images by the keystone correction unit 34, thereby acquiring second images (step S14).

The system controller 23 judges whether the imaging of the number of images to be captured, which is determined in step S12, is finished or not (step S15).

If the system controller 23 judges that the imaging of the number of images to be captured, which is determined in step S12, is not finished (step S15, NO), the system controller 23 goes back to the process of step S13. Thereby, the system controller 23 acquires the first images of the determined number of images to be captured, and keystone corrects the acquired first images, thereby acquiring second images.

Figure 11:
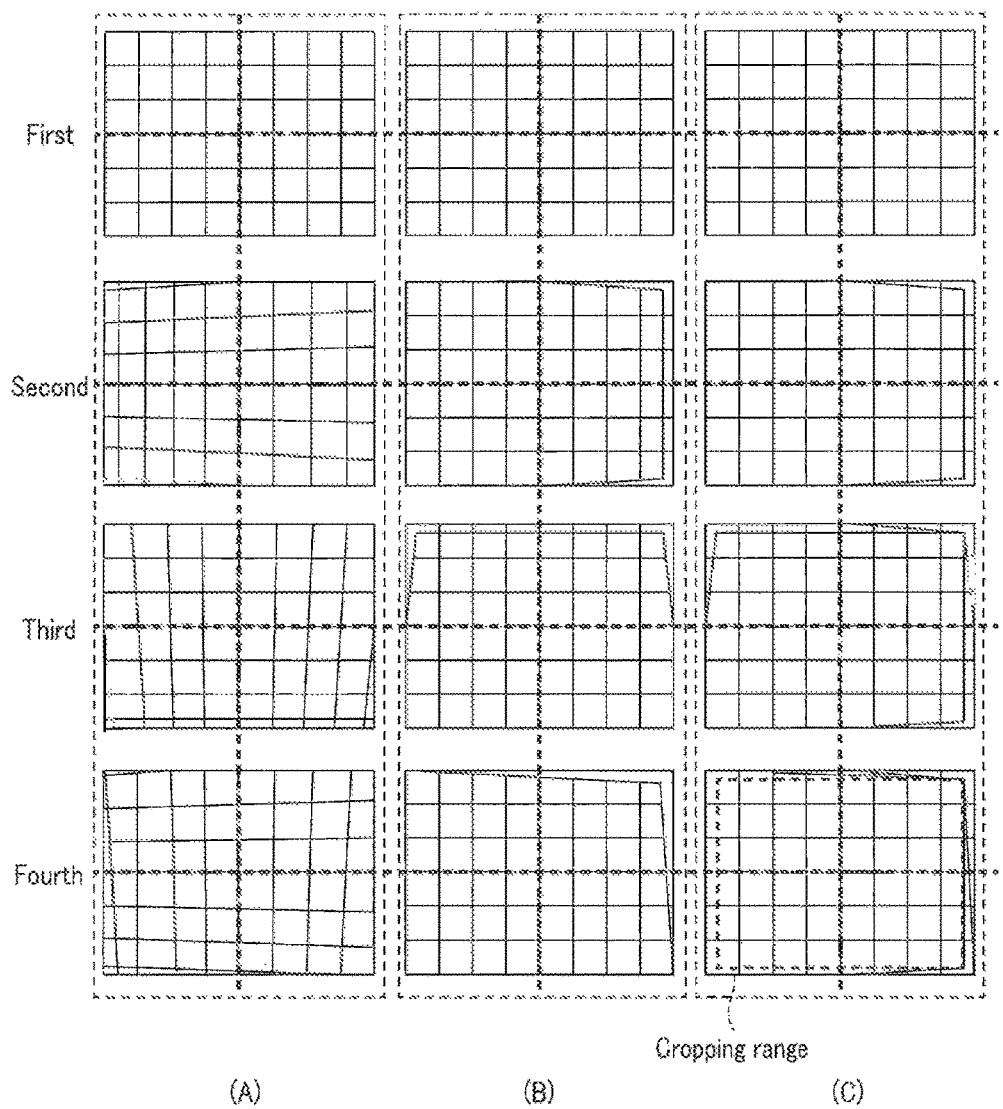
FIG. 11 is an explanatory view for explaining examples of images acquired by the image pickup apparatus according to the first embodiment.

FIG. 11 illustrates examples of images acquired by the flows of FIG. 9 and FIG. 10. Part (A) of FIG. 11 illustrates examples of plural first images acquired by a plurality of times of exposure. Part (B) of FIG. 11 illustrates examples of plural second images obtained by keystone-correcting the first images.

If the system controller 23 judges that the imaging of the number of images to be captured, which is determined in step S12, is finished (step S15, YES), the system controller 23 composites the acquired second images by the composite unit 35, and acquires a third image (step S16). For example, by making coincident the image center positions of the second images, the composite unit 35 composites the values of pixels of the second images by averaging compositing, addition compositing or comparative brightness compositing, thereby acquiring the third image. Part (C) of FIG. 11 illustrates examples of third images obtained by compositing plural second images. The system controller 23 may be configured such that, each time a first image is acquired, the system controller 23 corrects the first image to a second image, and each time the corrected second image is acquired, the system controller 23 generates a third image by using second images acquired thus far, or may be configured such that, after the imaging of the determined number of images to be captured is finished, the system controller 23 generates the third image.

The system controller 23 sets, by the cropping unit 36, a rectangular cropping range on the third image, based on the plural second images, as illustrated in part (C) of FIG. 11, crops an image from the third image in the set cropping range (step S17), and terminates the peripheral image blur correction process. The system controller 23 converts the image data, which is cropped by the cropping unit 36, to an image format for storage, thereby generating an image file for storage, and storing the image file in the recording device 27.

In addition, in step S11, if the system controller 23 judges that the peripheral image blur correction is not executed (step S11, NO), the system controller 23 executes a normal imaging process (step S18).

By the above-described process, an image, in which image blur even an image peripheral part is properly suppressed, can be acquired as illustrated in FIG. 11.

Next, the calculation method of the tolerable exposure time will be described in detail.

When an exposure time, at which a camera shake tends to easily occur, is defined as a camera shake limit time t, a real focal distance of the optical system 11 is defined as f, a focal distance converted in terms of a 35 mm film is defined as $f_{35}$, and a magnification of the size of the imaging plane of the imaging element 21 relative to a 35 mm film is defined as a, the camera shake limit time t is generally expressed by the following mathematical expression 4.

$$t = 1/f_{35} = a/f$$

$$f = a/t \quad \text{(mathematical expression 4)}$$

When an angular shake is defined as $\Delta\theta$, an image blur amount at the camera shake limit time t is defined as $\Delta\lambda$, a distance from the optical center of the optical system 11 on the imaging plane is defined as $\lambda$, and an image blur amount of the screen center of the imaging plane at the camera shake limit time t is defined as D, the relationship between the image blur amount $\Delta\lambda$ and the angular shake $\Delta\theta$ can be expressed by the following mathematical expression 5.

$$\Delta\lambda = f\Delta\theta$$

$$\Delta\theta = D/f \quad \text{(mathematical expression 5)}$$

Since the image blur amount D of the screen center can be considered as an image blur amount at a limit at which a camera shake is tolerable, the relationship between the angular shake $\Delta\theta$, image blur amount D, camera shake limit time t and magnification a can be expressed by the following mathematical expression 6 from mathematical expressions 4 and 5.

$$\Delta\theta = Dt/a \quad \text{(mathematical expression 6)}$$

Furthermore, by substituting mathematical expression 6 in mathematical expression 3, the following mathematical expression 7 is obtained.

$$\Delta\lambda = \Delta\lambda t \lambda^2/af \quad \text{(mathematical expression 7)}$$

By solving mathematical expression 7 with respect to the camera shake limit time t, mathematical expression 8, which indicates the camera shake limit time t at the position where the distance from the optical center is $\lambda$, is obtained.

$$t = af/\lambda^2 \quad \text{(mathematical expression 8)}$$

Based on this expression 8, it is possible to calculate the camera shake limit time t in a case in which the distance from the optical center is $\lambda$ and the focal distance is f.

For example, by the following mathematical expression 9, it is possible to calculate a tolerable exposure time $t_0$ that is a shutter speed at which an image blur amount at a position of a distance $\lambda$, which is about 0.4 times the diagonal length of the imaging plane from the center of the imaging plane with a size of 17.3 mm×13 mm, falls within substantially the same level as the camera shake limit time t in the OFF state of camera shake correction.

(mathematical expression 9)

$$t_0 = af/\lambda^2$$
$$= f \cdot \frac{\sqrt{17.3^2 + 13^2}}{\sqrt{36^2 + 24^2}} \cdot \frac{1}{\left(0.4 \cdot \sqrt{17.3^2 + 13^2}\right)^2}$$
$$= \frac{f}{0.16\sqrt{36^2 + 24^2} \cdot \sqrt{17.3^2 + 13^2}}$$
$$= \frac{f}{149.8} [\sec]$$

In addition, based on the above mathematical expression 8, the relationship between the focal distance and the tolerable exposure time in the case in which the camera shake correction is effective can be illustrated as in FIG. 12. According to the above mathematical expression 8, for example, the tolerable exposure time (at a time when image blur correction is effective) is 0.046729 [sec] and the number of images to be captured (at a time when image blur correction is effective) is 21.4, in a case in which the focal distance f is 7 mm, the distance λ is about 0.4 times the diagonal length of the imaging plane from the center of the imaging plane with the size of 17.3 mm×13 mm, and the exposure time (total exposure time) is one second.

Besides, when a maximum image blur amount at a peripheral part in a case in which camera shake correction is not effective is defined as Δλ', Δλ' can be expressed by the following mathematical equation 10.

$$\Delta\lambda' = \lambda^2 \Delta\theta / f + f \Delta\theta \quad \text{(mathematical expression 10)}$$

Here, when Δλ' is equal to D, it can be thought that the tolerable exposure time $t_0$' in a case in which the camera shake correction is not effective has been reached Thus, mathematical expression 10 can be expressed as the following mathematical expression 11.

$$D = \Delta\lambda' \rightarrow \lambda^2 \Delta\theta / f + f \Delta\theta \quad \text{(mathematical expression 11)}$$

Moreover, by substituting mathematical expression 6 in mathematical expression 11, mathematical expression 11 can be expressed as the following mathematical expression 12.

$$D = Dt(\lambda^2 / f + f) / a \quad \text{(mathematical expression 12)}$$

Furthermore, by modifying mathematical expression 12, it is possible to obtain the following mathematical expression 13 which indicates the tolerable exposure time $t_0$' in the case in which the camera shake correction is not effective.

$$t = \frac{fa}{(\lambda^2 + f^2)} \quad \text{(mathematical expression 13)}$$

For example, by the following mathematical expression 14, it is possible to calculate the tolerable exposure time $t_0$' for making the image blur amount at the position of the distance λ, which is about 0.4 times the diagonal length of the imaging plane from the center of the imaging plane with the size of 17.3 mm×13 mm, fall within the tolerable range.

(mathematical expression 14)

$$t'_0 = \frac{fa}{(\lambda^2 + f^2)}$$
$$= f \frac{\sqrt{17.3^2 + 13^2}}{\sqrt{36^2 + 24^2}} \cdot \frac{1}{\left(0.4 \cdot \sqrt{17.3^2 + 13^2}\right)^2 + f^2}$$
$$= \frac{0.50f}{74.9 + f^2} = \frac{f}{149.8 + 2f^2} [\sec]$$

Based on the above mathematical expression 14, the relationship between the focal distance and the tolerable exposure time in the case in which the camera shake correction is not effective can be illustrated as in FIG. 13.

In addition, according to the above mathematical expression 14, for example, the tolerable exposure time (at a time when image blur correction is not effective) is 0.028249 [sec] and the number of images to be captured (at a time when image blur correction is not effective) is 35.4, in a case in which the focal distance f is 7 mm, the distance λ is about 0.4 times the diagonal length of the imaging plane from the center of the imaging plane with the size of 17.3 mm×13 mm, and the exposure time (total exposure time) is one second.

As described above, the imaging condition determination unit 33 estimates the image movement amount which is the movement amount of the subject image occurring at the position of the predetermined distance from the optical center of the optical system 11 on the imaging lane, in the case in which the exposure of the total exposure time is executed based on the focal distance. The imaging condition determination unit 33 calculates the tolerable exposure time for making the image movement amount fall within the preset tolerable range. The imaging condition determination unit 3 sets an exposure time which is shorter than the tolerable exposure time, as a divisional exposure time which is a one-time exposure time in successive exposures. Incidentally, the above-described calculation method of the tolerable exposure time is merely an example, and the tolerable exposure time may be calculated by any method.

Next, the keystone correction by the keystone correction unit 34 will be described in detail.

The keystone correction unit 34 executes keystone correction (coordinate conversion) for the first image according to a technique of digitally reproducing an image of a shift lens. The keystone correction unit 34 executes keystone correction based on the tilt angle θ at the time of acquiring each of the plural first images, and the focal distance f of the optical system 11, thereby acquiring plural second images. Thereby, the keystone correction unit 34 corrects a keystone distortion which occurs in each of the first images due to a change of the attitude of the camera body 3.

In the meantime, when the blur correction unit 22 does not shift the imaging plane, the center of the angle of view overlaps the image center position (optical axis). Thus, in this case, the keystone correction unit 34 executes the keystone correction by setting the center of the angle of view as the image center position.

On the other hand, when the blur correction unit 22 shifts the imaging plane, the keystone correction unit 34 executes the keystone correction, based on the image center position which is moved by the shift.

A case is now assumed (mathematical expression 15)

$f$: focal distance $\begin{pmatrix} x \\ y \end{pmatrix}$: coordinates of an image before projection transform $\begin{pmatrix} x' \\ y' \\ z' \end{pmatrix}$: coordinates after projection transform $\begin{pmatrix} x'' \\ y'' \end{pmatrix}$: focal plane projection coordinates after projection transform $R$: rotation matrix of the camera $\begin{pmatrix} t_x \\ t_y \\ t_z \end{pmatrix}$: translational movement amount of the camera In this case, the relationship of coordinates before and after projection transform is expressed by the following mathematical expression 16.

$$\begin{pmatrix} x' \\ y' \\ z' \end{pmatrix} = R \begin{pmatrix} x \\ y \\ f \end{pmatrix} + \begin{pmatrix} t_x \\ t_y \\ t_z \end{pmatrix} \quad \text{(mathematical expression 16)}$$

R is a rotation matrix in the yaw direction and pitch direction. Thus, when the tilt angle in the yaw direction is θyaw and the tilt angle in the pitch direction is θpitch, R is expressed by the following mathematical expression 17.

$$R = \begin{pmatrix} 1 & 0 & 0 \\ 0 & \cos\theta_{pitch} & \sin\theta_{pitch} \\ 0 & \sin\theta_{pitch} & \cos\theta_{pitch} \end{pmatrix} \begin{pmatrix} \cos\theta_{yaw} & 0 & \sin\theta_{yaw} \\ 0 & 1 & 0 \\ -\sin\theta_{yaw} & 0 & \cos\theta_{yaw} \end{pmatrix}$$

(mathematical expression 17)

In addition, a reference point on the screen is expressed by the following mathematical expression 18.

(mathematical expression 18)

Reference point on the screen: $\begin{pmatrix} x_c \\ y_c \end{pmatrix}$

In this case, the following mathematical expression 19 is established.

$t_x = x_c - (\cos\theta_{pitch} x_c + \sin\theta_{yaw} f)$ $t_y = y_c - (\sin\theta_{pitch} \sin\theta_{yaw} x_c + \cos\theta_{pitch} y_c - \sin\theta_{pitch} \cos\theta_{yaw} f)$ $t_z = f - (-\cos\theta_{pitch} \sin\theta_{yaw} x_c + \sin\theta_{pitch} y_c + \cos\theta_{pitch} \cos\theta_{yaw} f)$ (mathematical expression 19)

If these coordinates are projected on the imaging plane by a central projection method, the following is given.

$x'' = f \cdot x'/z'$ $y'' = f \cdot y'/z'$ (mathematical expression 20)

These coordinates (x'', y'') are coordinates obtained by keystone-correcting the coordinates (x, y).

For example, a case is assumed in which the focal distance f=7 mm, the yaw-direction tilt angle θyaw=3.0 deg, the pitch-direction tilt angle=1.0 deg, and the reference point (x, y)=(0, 0), in this case, coordinates $P_0''$, coordinates $P_1''$ and coordinates $P_2''$ after keystone correction of coordinates $P_0$ (0, 0), coordinates $P_1$ (3, 4) and coordinates $P_2$ (−4, −3) on the imaging plane become coordinates $P_0''$ (0, 0), coordinates $P_1''$ (3.037, 4.050) and coordinates $P_2''$ (−3.910, −2.934).

As described above, the image pickup apparatus 1 according to the first embodiment causes the imaging element 21 to execute exposure a plurality of times in accordance with a one-time imaging instruction, and acquires a plurality of first images corresponding to a subject image formed on the imaging plane by the optical system 11. The image pickup apparatus 1 detects the tilt angle each time the first image is acquired, the tilt angle being a change amount of the attitude of the camera body 3 from the preset reference attitude in a direction with a rotational axis along a direction perpendicular to the optical axis of the optical system 11. The image pickup apparatus 1 acquires a plurality of second images by keystone-correcting a keystone distortion occurring between the plural first images due to the change of the attitude of the camera body 3, based on the tilt angle with respect to each of the first images, and the optical characteristic such as the focal distance of the optical system 11. The image pickup apparatus 1 detects a positional displacement amount between the plural second images, aligns the plural second images, based on the detected positional displacement amount, and acquires a third image by compositing the plural second images. According to this configuration, the image pickup apparatus 1 composites the images after correcting the keystone distortion. Thus, the image pickup apparatus 1 can composite the images with different tilt angles. As a result, the image pickup apparatus 1 can composite the image without leaving image blur at a peripheral part.

Second Embodiment

Next, an image pickup apparatus 1 according to a second embodiment will be described. Incidentally, the image pickup apparatus y according to the second embodiment differs from the image pickup apparatus 1 illustrated in FIG. 6 with respect to the method of determining the reference attitude of the camera body 3.

The blur correction microcomputer 24 of the image pickup apparatus 1 according to the second embodiment sets, as a reference attitude, the attitude of the camera body 3 at a time when exposure was first executed from the input of the imaging instruction, and detects a tilt angle as a change amount from the reference attitude of the camera body 3 at each time of a plurality of exposure. Furthermore, the blur correction microcomputer 24 updates the reference attitude, based on the maximum value and minimum value of the tilt angle detected with respect to each of a plurality of first images, and re-detects the tilt angle with respect to each of the plural first images, based on the updated reference attitude. The blur correction microcomputer 24 inputs the re-detected tilt angle to the system controller 23. In this case, the keystone correction unit 34 acquires a plurality of second images by executing keystone correction, based on the tilt angle θ re-detected with respect to each of the plural first images, and the focal distance f of the optical system 11.

Figure 14:
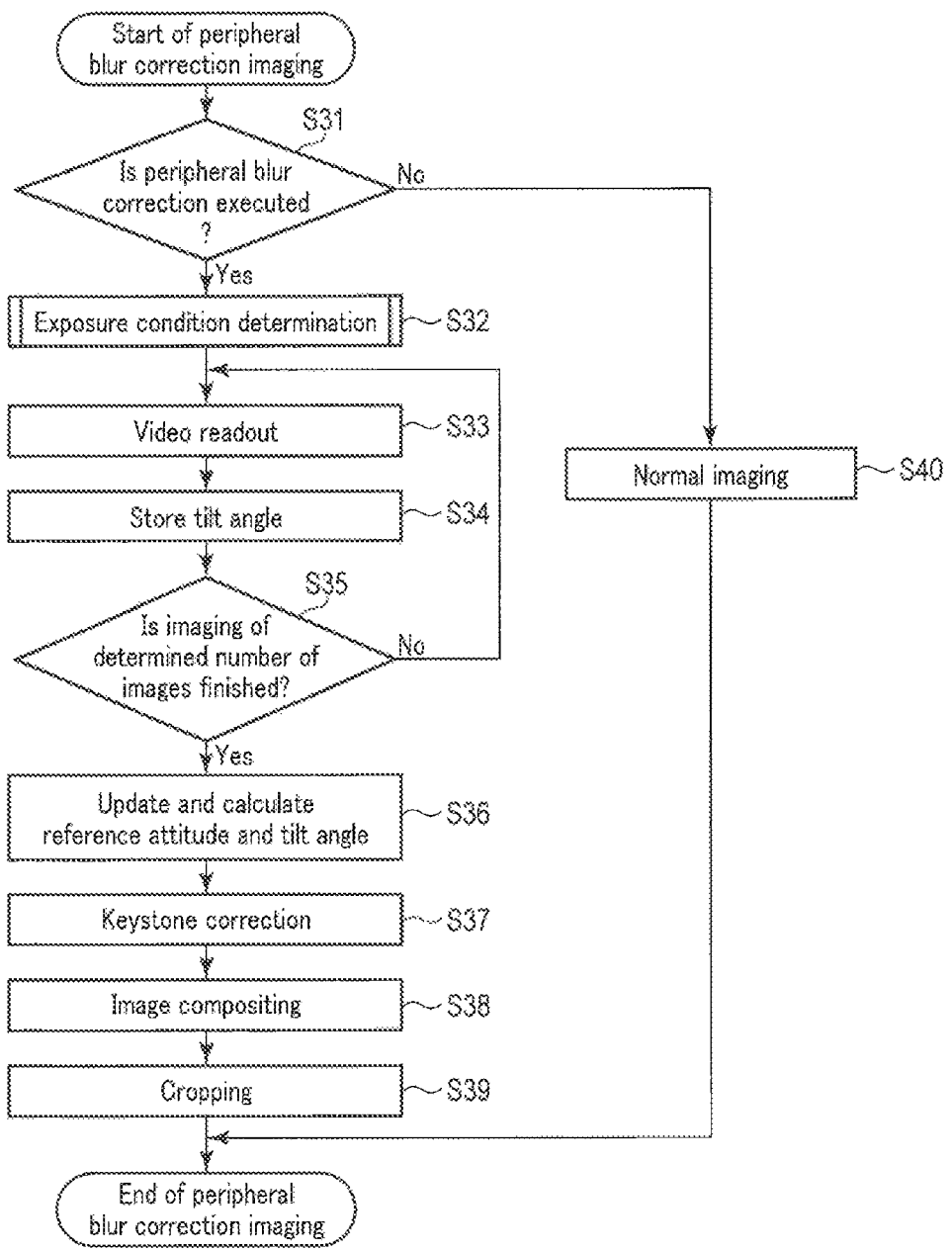
FIG. 14 is a view for explaining an example of the operation of an image pickup apparatus according to a second embodiment.

FIG. 14 is a flowchart illustrating the operation of the image pickup apparatus 1 at a time of performing peripheral image blur correction imaging according to the second embodiment. Incidentally, although FIG. 14 illustrates the operation relating to the peripheral image blur correction imaging, the control relating to camera shake correction and a process such as photometry are being executed in parallel. The system controller 23 executes the process of FIG. 14, when an imaging instruction is input.

The system controller 23 judges whether or not to execute peripheral image blur correction (step S31).

If it is judged that the peripheral image blur correction is to be executed, the system controller 23 determines the divisional exposure time and the number of images to be captured, as exposure conditions, by the exposure controller 32 and imaging condition determination unit 33 (step S32).

Next, in accordance with the processing result of step S32, the system controller 23 causes, by the imaging controller 31, the imaging element 21 to execute exposure, and performs image readout (step S33).

The system controller 23 associates and stores the first image and the tilt angle of the camera body 3 at the time of exposure of this first image (step S34).

The system controller 23 judges whether the imaging of the number of images to be captured, which is determined in step S32, is finished or not (step S35).

If the system controller 23 judges that the imaging of the number of images to be captured, which is determined in step S32, is not finished (step S35, NO), the system controller 23 goes back to the process of step S33. Thereby, the system controller 23 acquires the first images, the number of which corresponds to the determined number of images to be captured.

If the system controller 23 judges that the imaging of the number of images to be captured, which is determined in step S32, is finished (step S35, YES), the system controller 23 updates the reference attitude, based on the tilt angle with respect to each of the plural first images, and updates the tilt angle with respect to each of the plural first images, based on the updated reference attitude (step 36). For example, based on a central tendency such as a mean or a median of tilt angles with respect to the first images, the imaging condition determination unit 33 updates the reference attitude of the camera body 3. The imaging condition determination unit 33 updates the tilt angle with respect to each of the first images, based on the updated reference attitude of the camera body 3.

The system controller 23 inputs to the keystone correction unit 34 the plural first images and the tilt angle updated by the imaging condition determination unit 33 with respect to each of the first images, and keystone-corrects the first images by the keystone correction unit 34, thereby acquiring plural second images (step S37).

The system controller 23 composites the acquired second images, and acquires a third image (step S38). For example, by making coincident the image center positions of the second images, the composite unit 35 composites the values of pixels of the plural second images with respect to each of coordinates by averaging compositing, addition compositing or comparative brightness compositing, thereby acquiring the third image.

The system controller 23 sets, by the cropping unit 36, a rectangular cropping range on the third image, based on the plural second images, crops an image from the third image in the set lopping range (step S39), and terminates the peripheral image blur correction process. The system controller 23 converts the image data, which is cropped by the cropping unit 36, to an image format for storage, thereby generating an image file for storage, and storing the image file in the recording device 27.

In addition, in step S31, if the system controller 23 judges that the peripheral image blur correction is not executed (step S31, NO), the system controller 23 executes a normal imaging process (step S40).

Figure 15:
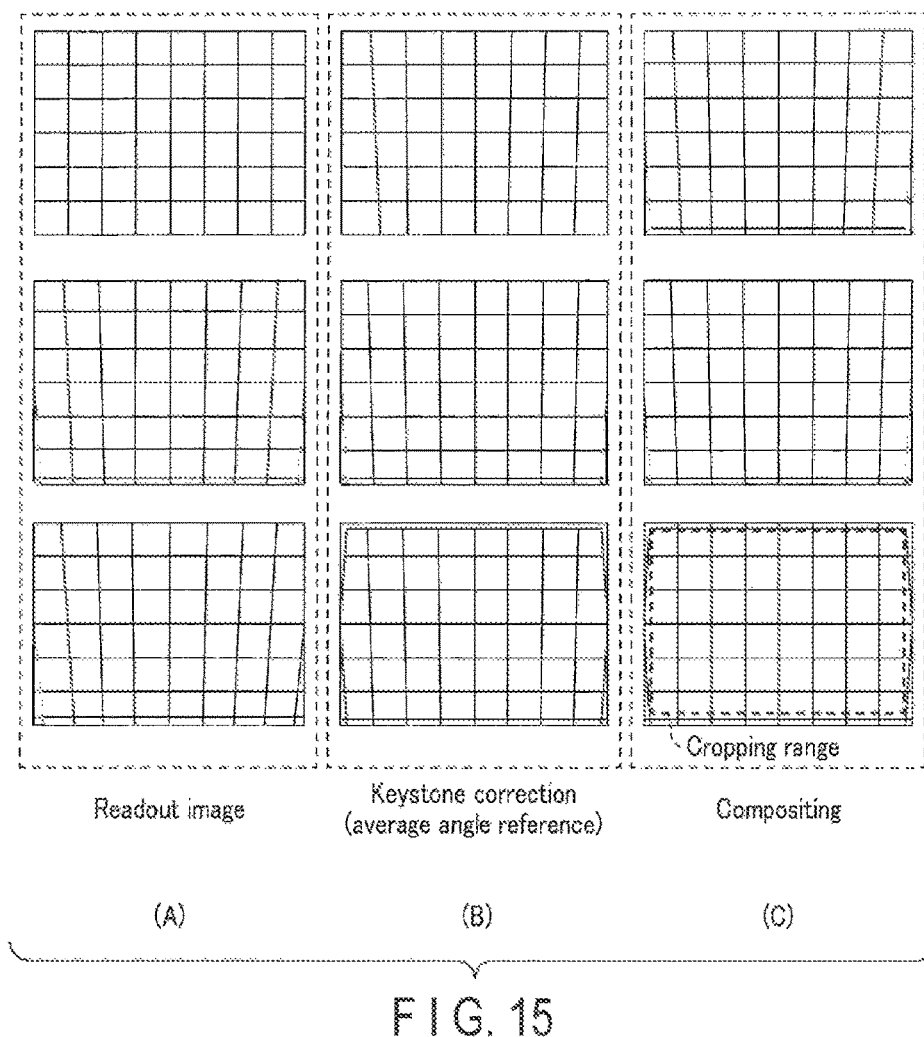
FIG. 15 is an explanatory view for explaining examples of images acquired by the image pickup apparatus according to the second embodiment.

FIG. 15 illustrates examples of images acquired by the flow of FIG. 14. Part (A) of FIG. 15 illustrates examples of plural first images acquired by exposures of several times. Part (B) of FIG. 15 illustrates examples of plural second images obtained by keystone-correcting the plural first images by using, as a reference, the reference attitude updated by the above procedure. Part (C) of FIG. 15 illustrates examples of third images obtained by compositing plural second images.

According to the above-described embodiment, before acquiring the second images by keystone-correcting the first images, the system controller 23 determines the reference attitude, based on the central tendency of the attitude of the camera body 3 at the time of acquiring the plural first images. Based on the determined reference attitude, the system controller 23 keystone-corrects the respective first images, and acquires the second images. Thereby, compared to the first embodiment in which keystone correction is executed by using, as the reference attitude, the attitude of the image pickup apparatus 1 at the time of the first exposure, it is possible to reduce the deformation of each image by keystone correction. As a result, it is possible to make smaller the area in which the image included in the second image does not exist. Therefore, as illustrated in part (C) of FIG. 15, the image pickup apparatus 1 according to the second embodiment can set a larger cropping range than in the first embodiment.

Third Embodiment

Next, an image pickup apparatus 1 according to a third embodiment will be described. Incidentally, the image pickup apparatus 1 according to the third embodiment differs from the image pickup apparatus 1 illustrated in FIG. 6 with respect to the method of determining the exposure condition and the Procedure of the image processing.

The image pickup apparatus 1 according to the third embodiment executes so-called "live view bulb imaging". In the live view bulb imaging, the imaging element 21 is caused to execute exposure a plurality of times with a redetermined exposure time from when an imaging start instruction as an imaging instruction is input to when an imaging end instruction as an imaging instruction is input, thereby acquiring a plurality of first images. A plurality of second images are acquired by keystone-correcting the plural first images. Each time the second image is acquired, a composite image is acquired by compositing the second images acquired thus far.

Figure 16:
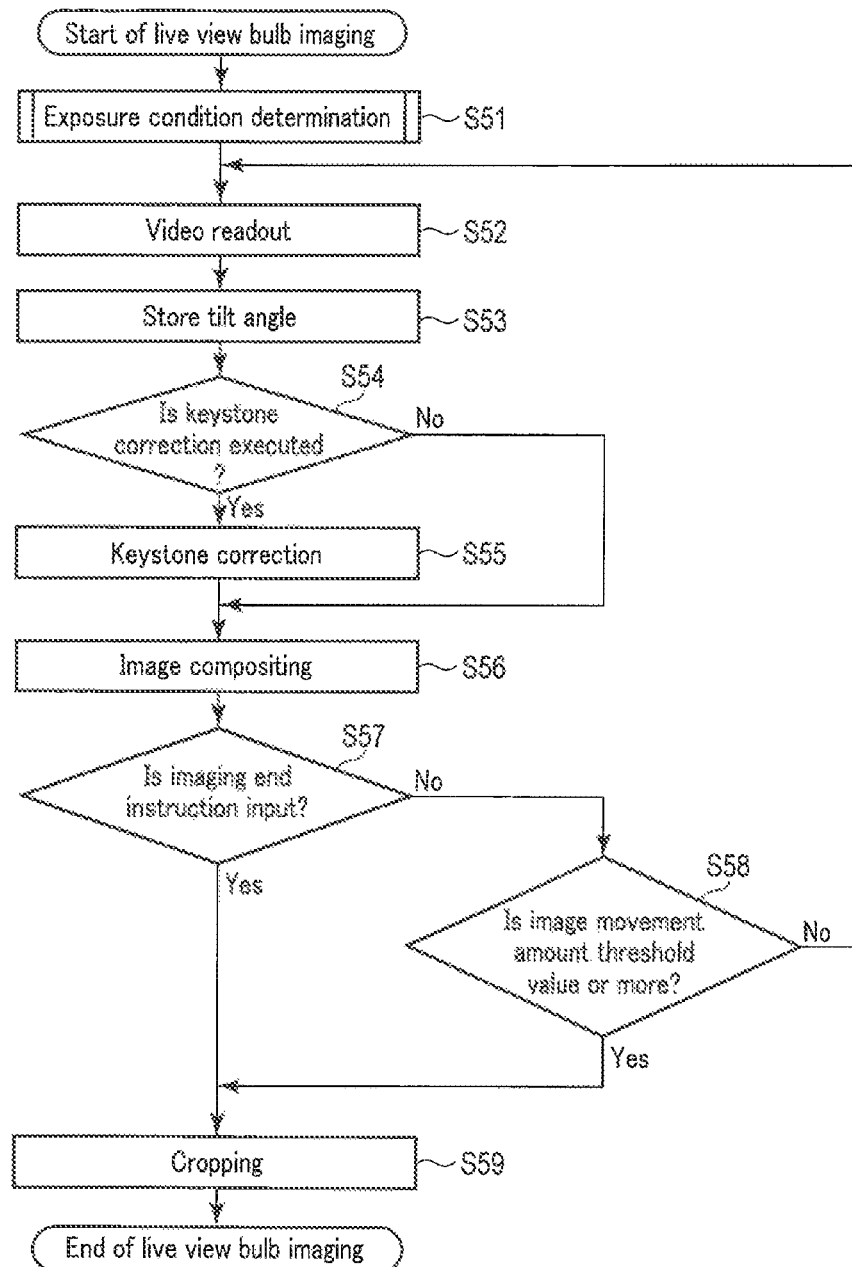
FIG. 16 is a view for explaining an example of the operation of an image pickup apparatus according to a third embodiment.

FIG. 16 and FIG. 17 are flowcharts illustrating the operation of the image pickup apparatus 1 according to the third embodiment, at a time of executing live view bulb imaging, while executing peripheral image blur correction. Although FIG. 16 and FIG. 17 illustrate the operation relating to the live view bulb imaging, the control relating to camera shake correction and a process such as photometry are being executed in parallel. The system controller 23 executes the process of FIG. 16, when an imaging instruction is input.

The system controller 23 determines the divisional exposure time, as an exposure condition, by the exposure controller 32 and imaging condition determination unit 33 (step S51).

As illustrated in FIG. 17, the imaging condition determination unit 33 judges whether camera shake correction by the blur correction unit 22 is effective or not (step S61). If the imaging condition determination unit 33 judges that camera shake correction by the blur correction unit 22 effective (step S61, YES), the imaging condition determination unit 33 calculates a tolerable exposure time at a time when the camera shake correction is effective, based on a movement amount of the imaging plane by the camera shake correction, and the focal distance of the optical system 11, and determines a divisional exposure time which is shorter than this tolerable exposure time (step S62).

In addition, if the imaging condition determination unit 33 judges that camera shake correction by the blur correction unit 22 is not effective (step S61, NO), the imaging condition determination unit 33 calculates a tolerable exposure time at a time when the camera shake correction is not effective, based on the focal distance of the optical system 11, and determines a divisional exposure time which is shorter than this tolerable exposure time (step S63).

Next, in accordance with the processing result of step S51, the system controller 23 causes, by the imaging controller 31, the imaging element 21 to execute exposure, and performs image readout (step S52).

The system controller 23 associates and stores the first image and the tilt angle of the camera body 3 at the time of exposure of this first image (step S53).

The system controller 23 judges whether it is necessary to keystone-correct the acquired first images (step S54). For example, based on the information which the optical characteristic obtained in advance from the LCU 12 indicates, the system controller 23 judges whether it is necessary to execute keystone-correction. Specifically, the system controller 23 determines that it is necessary to execute keystone-correction, when the optical characteristic obtained in advance from the LCU 12 indicates a focal distance which is shorter than a preset focal distance, and when the projection method is central projection.

If the system controller 23 judges that it is necessary to keystone-correct the acquired first images (step S54, YES), the system controller 23 inputs to the keystone correction unit 34 the first images and the tilt angle with respect to each of the first images, and keystone-corrects the first images by the keystone correction unit 34, thereby acquiring second images (step S55). In addition, if the system controller 23 judges that it is not necessary to keystone-correct the acquired first images (step S54, NO), the system controller 23 advances to the process of step S56.

The system controller 23 aligns and composites the plural second images acquired from the input of the imaging start instruction, and acquires a third image (step S56). Specifically, each time the system controller 23 acquires the second image, the system controller 23 acquires the third image by compositing, by the composite unit 35, the plural second images obtained by keystone-correcting the first images acquired from the start of plural times of exposure. In this case, the composite unit 35 composites the plural second images by addition compositing or comparative brightness compositing, thereby acquiring the third image. Incidentally, the system controller 23 may convert the third image to an image format for displaying the third image on the EVF 26, and may display the third image on the EVE 26.

In the meantime, when it is judged in step S54 that it is not necessary to keystone-correct the first images, the composite unit 35 detects a positional displacement amount between the plural first images, aligns the plural first images, based on the detected positional displacement amount, and acquires a third image by compositing the plural first images. Besides, the composite unit 35 may be configured to acquire the third image by compositing the first images and second images which are in the mixed state.

The system controller 23 judges whether an imaging end instruction is input or not (step S57). For example, if the imaging end instruction is input, the system controller 23 judges that the imaging is to be finished.

If the imaging end instruction is not input (step S57, NO), the system controller 23 judges whether the image movement amount, which is used for blur correction by the blur correction unit 22, reaches a preset threshold value or more (step S58). Specifically, the system controller 23 functions as a correction, limit determination unit which judges whether the image movement amount reaches a correction limit at which correction is possible by the blur correction unit 22. If the system controller 23 judges that the image movement amount is not the preset threshold value or more (step S58, NO), the system controller 23 goes back to step S52, and continues the live view bulb imaging.

If the imaging end instruction is input (step S57, YES), or if the system controller 23 judges that the image movement amount is the preset threshold value or more (step S58, YES), the system controller 23 judges that the live view bulb imaging is to be finished, and advances to the process of step S59.

The system controller 23 sets a rectangular cropping range on the last acquired third image, crops an image from the third image in the set cropping range (step S59), and terminates the live view bulb imaging. The system controller 23 converts the image data, which is cropped by the cropping unit 36, to an image format for storage, thereby generating an image file for storage, and storing the image file in the recording device 27.

According to the above-described embodiment, each time the system controller 23 acquires the first image, the system controller 23 acquires the second image by keystone-correcting the first image. Each time the system controller 23 acquires the second image, the system controller 23 acquires the third image by compositing the plural second images acquired from the imaging start instruction. Thereby, the live view bulb imaging can be executed in the state in which the keystone distortion is properly corrected. As a result, the convenience for the user can further be improved.

In the meantime, the system controller 23 may be configured to execute addition compositing at a time of compositing plural second images, and to judge that the live view bulb imaging is to be finished, when the third image composited by the addition compositing has reached proper exposure. Furthermore, the system controller 23 may be configured to obtain a slow shutter effect by executing exposure such that each of exposures of plural times may become proper, on the assumption that averaging compositing or comparative brightness compositing is executed when the plural second images are composited.

Fourth Embodiment

Figure 18:
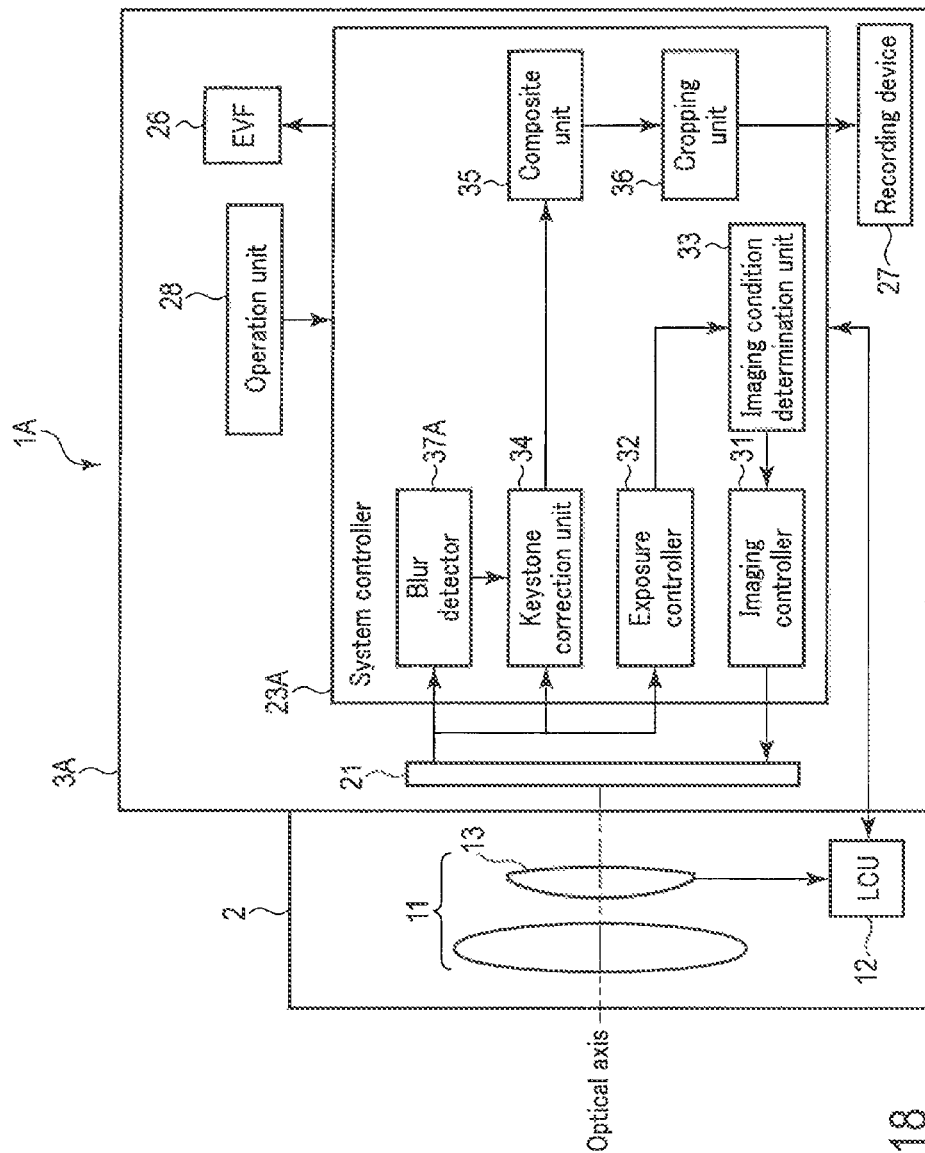
FIG. 18 is a view for explaining an example of the configuration of an image pickup apparatus according to a fourth embodiment.

FIG. 18 illustrates a configuration example of an image pickup apparatus 1A according to a fourth embodiment. Incidentally, the same structures as in the first embodiment are denoted by like reference numerals, and a detailed description thereof is omitted.

The image pickup apparatus 1A does not include the image blur correction device. By shifting an effective area that is an area for recording an image on the imaging plane, the image pickup apparatus 1A suppresses image blur of a subject image between a plurality of images. The image pickup apparatus 1A includes an interchangeable lens 2 and a camera body 3A. The image pickup apparatus 1A keystone-corrects each of a plurality of images acquired by executing exposure a plurality of times with an exposure time which is shorter than an exposure time that is determined based on a photometry result or the like in accordance with a one-time imaging instruction, and composites the keystone-corrected images. Thereby, the image pickup apparatus 1A executes image blur correction and peripheral image blur correction imaging for properly suppressing distortion.

The camera body 3A includes an imaging element 21, system controller 23A, an electronic view finder (EVF) 26, a recording device 27, and an operation unit 28.

The system controller 23A, like the system controller 23, is a controller which includes, for example, a CPU and a memory, and controls the operation of the camera body 3A. For example, the system controller 23A reads out image data acquired by the imaging element 21, and applies various image processes, which are necessary for display or storage, to the read-out image data. In addition, the system controller 23A instructs the LCU 12 of the interchangeable lens 2 to drive the aperture for exposure adjustment, or to drive the lens for focal adjustment. Furthermore, the system controller 23A executes control of image display in the EVF 26, control of storage of image files in the recording device 27, control to switch the operation mode in accordance with the operation of the operation unit 28, and control to start or stop the imaging operation.

In addition, the system controller 23A acquires optical characteristic information from the interchangeable lens 2. For example, the system controller 23A acquires optical characteristic information from the interchangeable lens 2 at a time of activation and/or periodically, thereby recognizing the optical characteristics of the interchangeable lens 2 at each time.

The system controller 23A includes an, imaging controller 31, an exposure controller 32, an imaging condition determination unit 33, a keystone correction unit 34, a composite unit 35, a cropping unit 36, and a blur detector 37A.

The blur detector 37A calculates an image movement amount between a plurality of first images, based on the plural first images acquired by exposure which is executed a plurality of times in accordance with a one-time imaging instruction. The blur detector 37A detects the image movement amount between the plural first images, for example, by executing pattern matching between the plural first images. Based on the detected image movement amount and the focal distance of the optical system 11 which the optical characteristic indicates, the blur detector 37A calculates a tilt angle at a time of photographing each first image, by setting, as a reference attitude, the attitude of the camera body 3A at a time of photographing one of the plural first images. Specifically, the blur detector 37A calculates the image movement amount for the first image in the case in which the attitude of the camera body 3A is the reference attitude, and calculates the tilt angle that is the change amount of the attitude of the camera body 3A relative to the reference attitude, based on the calculated image movement amount and the focal distance of the optical system 11.

The keystone correction unit 34 keystone-corrects the first images, based on the tilt angle at the time of photographing each first image, which was calculated by the blur detector 37A, and acquires second images.

Figure 19:
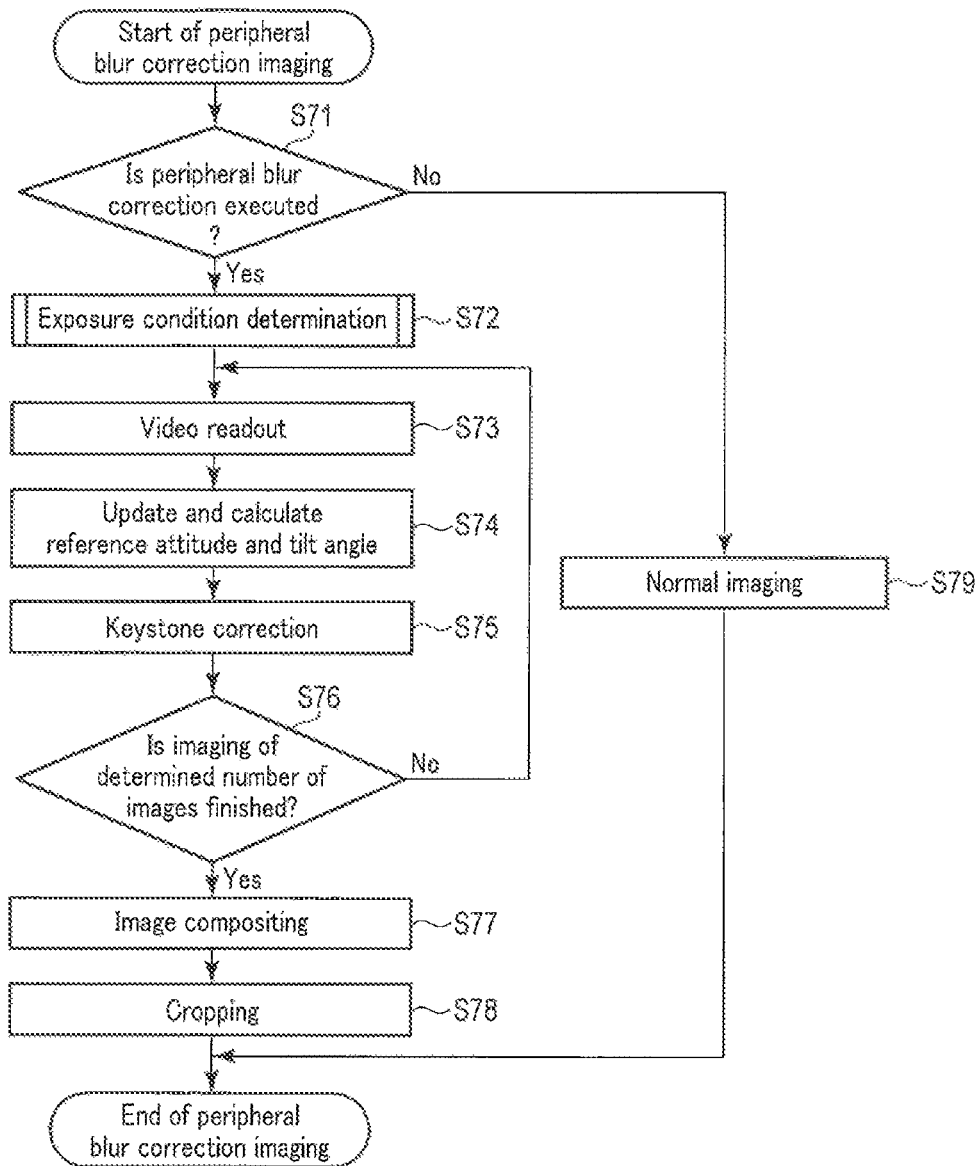
FIG. 19 is a view for explaining an example of the operation of the image pickup apparatus according to the fourth embodiment.

FIG. 19 and FIG. 20 are flowcharts illustrating the operation of the image pickup apparatus 1A at a time of performing peripheral image blur correction imaging. Incidentally, although FIG. 19 and FIG. 20 illustrate the operation relating to the peripheral image blur correction imaging, the control relating to camera shake correction and a process such as photometry are being executed in parallel. The system controller 23A executes the processes of FIG. 19 and FIG. 20, when an imaging instruction is input.

The system controller 23A judges whether or not to execute peripheral blur correction (step S71).

If it is judged that the peripheral blur correction is to be executed (step S71, YES), the system controller 23A determines the divisional exposure time and the number of images to be captured, as exposure conditions, by the exposure controller 32 and imaging condition determination unit 33 (step S72).

FIG. 20 is a flowchart illustrating the operation of the image pickup apparatus 1A at a time of executing the exposure condition determination process. For example, the system controller 23A calculates the total exposure time, the sensitivity of the imaging element 21 and the aperture value by executing automatic exposure process (AE process) by the exposure controller 32 (step S81).

The imaging condition determination unit 33 calculates a tolerable exposure time at a time when the camera shake correction is effective, based on brightness information that is a result of photometry, and the focal distance of the optical system 11, and determines a divisional exposure time which is shorter than this tolerable exposure time (step S82).

Furthermore, the imaging condition determination unit 33 determines the number of images to be captured, based on the total exposure time and divisional exposure time (step S83).

Next, as illustrated in FIG. 19, in accordance with the processing result of step S72, the system controller 23A causes, by the imaging controller 31, the imaging element 21 to execute exposure, and performs image readout (step S73).

The system controller 23A calculates, by the blur detector 37A, the image movement amount in the first image and the tilt angle of the camera body 3A at the time of acquiring the first image (step S74). For example, the blur detector 37A calculates the image movement amount by using, as a reference, the first image acquired by the first exposure among the exposures of plural times. In addition, the blur detector 37A calculates, with respect to each first image, the tilt angle relative to the attitude of the camera body 3A at the time of acquiring the first image which was acquired by the first exposure among the exposures of plural times.

The system controller 23A inputs to the keystone correction unit 34 the first images and the tilt angle calculated based on the plural first images, and keystone-corrects the first images by the keystone correction unit 34, thereby acquiring second images (step S75).

The system controller 23A judges whether the imaging of the number of images to be captured, which is determined in step S72, is finished or not (step S76).

If the system controller 23A judges that the imaging of the number of images to be captured, which is determined in step S72, is not finished (step S76, NO), the system controller 23A goes back to the process of step S73.

If the system controller 23 judges that the imaging of the number of images to be captured, which is determined in step S72, is finished (step S76, YES), the system controller 23A composites the acquired second images by the composite unit 35, and acquires a third image (step S77).

The system controller 23A sets, by the cropping unit 36, a rectangular cropping range on the third image, based on the plural second images, crops an image from the third image in the set cropping range (step S78), and terminates the peripheral image blur correction process. The system controller 23A converts the image data, which is cropped by the cropping unit 36, to an image format for storage, thereby generating an image file for storage, and storing the image file in the recording device 27.

As described above, the image pickup apparatus 1A according to the fourth embodiment calculates the tilt angle of the camera body 3A at the time of photographing each first image, based on the plural first images. The image pickup apparatus 1A acquires second images by keystone-correcting the first images, based on the tilt angle, and acquires a third image by compositing the plural second images. In this manner, even in the case in which the gyro sensor or the like is not provided, the image pickup apparatus 1A can calculate the tilt angle of the camera body 3A at the time of photographing each first image, based on the successively acquired first images. Therefore, the keystone distortion can properly be corrected. As a result, the image pickup apparatus 1A can composite the image without leaving image blur at a peripheral part.

In the meantime, the functions described in the above embodiments may be constituted not only by using hardware, but may also be implemented by using software and causing a computer to read in programs in which the respective functions are described. In addition, each function may be constituted by selecting either software or hardware, as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An image pickup apparatus comprising:
an imaging element including an imaging plane on which pixels configured to convert light to an electric signal are element;
a body configured to hold the imaging element;
a reception circuit configured to receive an optical characteristic of an image pickup optical system configured to form a subject image on the imaging plane;
an imaging control circuit configured to acquire a plurality of first images corresponding to the subject image formed on the imaging plane by the image pickup optical system by causing the imaging element to execute exposure a plurality of times in accordance with an imaging instruction that is input;
an attitude detection circuit configured to detect a tilt angle each time exposure is executed, the tilt angle being a change amount of an attitude of the body from a reference attitude in a direction with a rotational axis along a direction perpendicular to an optical axis of the image pickup optical system; and
a system controller including a keystone correction circuit and a composite circuit, the keystone correction circuit being configured to correct a keystone distortion occurring in each of the plurality of first images due to a change of the attitude of the body, by keystone correction based on the tilt angle corresponding to the plurality of first images, and the optical characteristic, thereby generating a plurality of second images, and the composite circuit being configured to generate a third image by compositing the plurality of second images;
wherein the attitude detection circuit is configured to update the reference attitude, based on a maximum value and a minimum value of the tilt angle detected with respect to each of the plurality of first images, and to re-detect the tilt angle with respect to each of the plurality of first images, based on the updated reference attitude.

2. The image pickup apparatus of claim 1, wherein the attitude detection circuit is configured to detect the tilt angle by using, as the reference attitude, the attitude of the body at a time when first exposure is executed from the input of the imaging instruction.

3. The image pickup apparatus of claim 1 wherein the optical characteristic includes at least a focal distance of the image pickup optical system,
the system controller further includes an exposure control circuit configured to measure brightness information indicative of a brightness of the subject image, based on the subject image formed on the imaging plane, and to determine a total exposure time, based on the brightness information, and an imaging condition determination circuit configured to determine a divisional exposure time which is a one-time exposure time, based on the focal distance,
wherein the imaging control circuit is configured to acquire the plurality of first images by executing, a plurality of times, exposure of a time corresponding to the divisional exposure time.

4. The image pickup apparatus of claim 3, wherein the imaging condition determination circuit is configured to determine a number of images to be captured, based on the total exposure time and the divisional exposure time, and
the imaging control circuit is configured to execute the exposure of the time corresponding to the divisional exposure time by a number of times corresponding to the number of images to be captured, and configured to acquire the plurality of first images.

5. The image pickup apparatus of claim 4, wherein the imaging condition determination circuit is configured to determine the number of images to be captured, by dividing the total exposure time by the divisional exposure time.

6. The image pickup apparatus of claim 3, wherein the imaging condition determination circuit, is configured to estimate an image movement amount which is a movement amount of the subject image occurring at a position of a predetermined distance from an image center position which is a position on an image corresponding to the optical axis of the image, pickup optical system on the imaging plane, in a case in which the exposure of the total exposure time is executed based on the focal distance, and configured to calculate, as the divisional exposure time, an exposure time for making the image movement amount fall within a preset tolerable range.

7. The image pickup apparatus of claim 1, wherein the composite circuit is configured to align the plurality of second images by a process of making coincident image center positions which are positions on the images corresponding to the optical axis of the image pickup optical system, and configured to acquire the third image by compositing the plurality of second images by averaging compositing which averages output values of pixels of the plurality of second images with respect to each of coordinates.

8. The image pickup apparatus of claim 1, wherein the composite circuit is configured to align the plurality of second images by a process of making coincident image center positions which are positions on the plurality of second images corresponding to the optical axis of the image pickup optical system, and configured to acquire the third image by compositing the plurality of second images by addition compositing which adds output values of pixels of the plurality of second images with respect to each of coordinates.

9. The image pickup apparatus of claim 1, wherein the composite circuit is configured to align the plurality of second images by a process of making coincident image center positions which are positions on the images corresponding to the optical axis of the image pickup optical system, and configured to acquire the third image by executing image compositing by comparative brightness compositing which compares output values of pixels of the plurality of second images with respect to each of coordinates, and which adopts an output value of a brighter pixel as an output value of a pixel of an image after compositing.

10. The image pickup apparatus of claim 1, wherein the attitude detection circuit is configured to execute pattern matching between the plurality of first images, and to detect a change of the tilt angle between the plurality of first images, based on a result of the pattern matching.

11. An image pickup apparatus comprising:
an imaging element including an imaging plane on which pixels configured convert light to an electric signal are arrayed;
a body configured to hold the imaging element;
a reception circuit configured to receive an optical characteristic of an image pickup optical system configured to form a subject image on the imaging plane;
an imaging control circuit configured to acquire a plurality of first images corresponding to the subject image formed on the imaging plane by the image pickup optical system by causing the imaging element to execute exposure a plurality of times in accordance with an imaging instruction that is input;
an attitude detection circuit configured to detect a tilt angle each time exposure is executed, the tilt angle being a change amount of an attitude of the body from a reference attitude in a direction with a rotational axis along a direction perpendicular to an optical axis of the image pickup optical system; and
a system controller including a keystone correction circuit and a composite circuit, the keystone correction circuit being configured to correct a keystone distortion occurring in each of the plurality of first images due to a change of the attitude of the body, by keystone correction based on the tilt angle corresponding to the plurality of first images, and the optical characteristic, thereby generating a plurality of second images, and the composite circuit being configured to generate a third image by compositing the plurality of second images,
wherein the imaging control circuit is configured to cause the imaging element to execute exposure a plurality of times with a predetermined exposure time from when imaging is started to when imaging is judged to be finished, thereby acquiring the plurality of first images,
the keystone correction circuit is configured to generate the plurality of second images by keystone-correcting the plurality of first images each time an image of the plurality of first images is acquired, and
the composite circuit is configured to generate the third image by compositing the plurality of second images acquired from a start of imaging, by addition compositing or comparative brightness compositing, each time an image of the plurality of second images is acquired, and
the optical characteristic includes at least a focal distance of the image pickup optical system, and
the image pickup apparatus further includes:
an image blur detection sensor configured to detect an image movement amount during exposure of the subject image on the imaging plane, based on the focal distance and the tilt angle; and
an image blur correction actuator configured to adjust a positional relationship between the subject image and the imaging plane, based on the image movement amount, and
the system controller further includes, a correction limit determination circuit configured to judge whether the image movement amount reaches a preset threshold value or more, and to judge that imaging is to be finished, when the correction limit determination circuit judges that the image movement amount is the preset threshold value or more.

12. An image pickup apparatus comprising:
an imaging element including an imaging plane on which pixels configured to convert light to an electric signal are arrayed;
a body configured to hold the imaging element;
a reception circuit configured to receive an optical characteristic of an image pickup optical system configured to form a subject image on the imaging plane;
a body configured to hold the image element;
a reception circuit configured to receive an optical characteristic of an image pickup optical system configured t form a subject image on the imaging plane;
an imaging control circuit configured to acquire a plurality of first images corresponding to the subject image formed on the imaging plane by the image pickup optical system by causing the imaging element to execute exposure a plurality of times in accordance with an imaging instruction that is input;
an attitude detection circuit configured to detect a tilt angle each time exposure is executed, the tilt angle being a change amount of an attitude of the body from a reference attitude in a direction with a rotational axis along a direction perpendicular to an optical axis of the image pickup optical system; and a system controller including a keystone correction circuit and a composite circuit, the keystone correction circuit being configured to correct a keystone distortion occurring in each of the plurality of first images due to a change of the attitude of the body, by keystone correction based on the tilt angle corresponding to the plurality of first images, and the optical characteristic, thereby generating a plurality of second images, and the composite circuit being configured to generate a third image by compositing the plurality of second images;

wherein the optical characteristic includes a focal distance of the image pickup optical system and a projection method, the system controller further includes a keystone correction execution determination circuit configured to determine whether or not to execute the keystone correction, based on at least one of the focal distance and the projection method, and the composite circuit is configured to acquire the third image by compositing the plurality of first images, when the keystone correction execution determination circuit determines that the keystone correction is not executed.

13. An image pickup method which an image pickup apparatus executes, the image pickup apparatus including an imaging element including an imaging plane on which pixels configured to convert light to an electric signal are arrayed, a body configured to hold the imaging element, and an image pickup optical system configured to form a subject image on the imaging plane, the method comprising:

acquiring an optical characteristic of the image pickup optical system;

acquiring a plurality of first images corresponding to the subject image formed on the imaging plane by the image pickup optical system by causing the imaging element to execute exposure a plurality of times in accordance with an imaging instruction that is input;

detecting a tilt angle each time exposure is executed, the tilt angle being a change amount of an attitude of the body from a reference attitude in a direction with a rotational axis along a direction perpendicular to an optical axis of the image pickup optical system; and correcting a keystone distortion occurring in each of the plurality of first images due to a change of the attitude of the body, by keystone correction based on the tilt angle corresponding to the plurality of first images, and the optical characteristic, thereby generating a plurality of second images;

generating a third image by compositing the plurality of second images;

updating the reference attitude, based on a maximum value and a minimum value of the tilt angle detected with respect to each of the plurality of first images; and re-detecting the tilt angle with respect to each of the plurality of first images, based on the updated attitude.

* * * * *